United States Patent
Harrison et al.

(10) Patent No.: US 12,243,069 B1
(45) Date of Patent: Mar. 4, 2025

(54) PAYMENT INSTRUMENT CRYPTOCURRENCY REWARDS AND LENDING PLATFORM

(71) Applicant: Gemini IP, LLC, New York, NY (US)

(72) Inventors: Thomas Harrison, New York, NY (US); Thomas Vaniotis, New York, NY (US); Wendy Mock, New York, NY (US); Soeren Roerden, Brooklyn, NY (US); Evan Eisman, New York City, NY (US); Francis Chen, New York City, NY (US)

(73) Assignee: Gemini IP, LLC, New York, NY (US)

( * ) Notice: Subject to any disclaimer, the term of this patent is extended or adjusted under 35 U.S.C. 154(b) by 0 days.

(21) Appl. No.: 17/587,218

(22) Filed: Jan. 28, 2022

Related U.S. Application Data

(60) Provisional application No. 63/278,875, filed on Nov. 12, 2021.

(51) Int. Cl.
*G06Q 30/00* (2023.01)
*G06Q 30/0226* (2023.01)

(52) U.S. Cl.
CPC .............................. *G06Q 30/0226* (2013.01)

(58) Field of Classification Search
None
See application file for complete search history.

(56) References Cited

U.S. PATENT DOCUMENTS

| | | | | |
|---|---|---|---|---|
| 11,232,514 | B1* | 1/2022 | DeMaio | G06F 9/451 |
| 2004/0199431 | A1* | 10/2004 | Ganesan | G06Q 20/04 |
| | | | | 705/26.1 |
| 2005/0222951 | A1* | 10/2005 | Sherman | G06Q 40/02 |
| | | | | 705/40 |
| 2010/0094697 | A1* | 4/2010 | Cavanaugh | G06Q 30/0601 |
| | | | | 705/40 |
| 2012/0005117 | A1* | 1/2012 | Klein | G06Q 40/06 |
| | | | | 705/36 R |
| 2014/0012754 | A1* | 1/2014 | Hanson | G06Q 20/042 |
| | | | | 705/44 |
| 2015/0073993 | A1* | 3/2015 | Robelo | G06Q 20/3676 |
| | | | | 705/44 |
| 2017/0109744 | A1* | 4/2017 | Wilkins | H04L 9/3236 |
| 2018/0218287 | A1* | 8/2018 | Wang | G06Q 30/0201 |

(Continued)

OTHER PUBLICATIONS

Dashkevich; Blockchain Application for Central Banks_ A Systematic Mapping Study; IEEE; 8/11/202; 35 pages.*

(Continued)

*Primary Examiner* — Radu Andrei
(74) *Attorney, Agent, or Firm* — Lee & Hayes, P.C.

(57) ABSTRACT

Systems and methods for payment instrument cryptocurrency rewards and lending are disclosed. A payment instrument may be utilized and a cryptocurrency reward amount may be determined for purchases made using the payment instrument. A series of processes may be performed to acquire cryptocurrency for distribution to a user account of the payment instrument, and when authorized, the cryptocurrency reward amount may be associated, sometimes directly, with a lending platform such that an earning amount is provided to the user in exchange for lending the cryptocurrency on the lending platform.

12 Claims, 11 Drawing Sheets

(56) References Cited

U.S. PATENT DOCUMENTS

| | | | | |
|---|---|---|---|---|
| 2019/0147486 A1* | 5/2019 | Monaco | ............... | G07G 1/0009 |
| | | | | 705/14.38 |
| 2019/0197617 A1* | 6/2019 | Chopra | ................ | G06Q 40/03 |
| 2019/0287169 A1* | 9/2019 | Jibowu | ................ | G06N 20/00 |
| 2019/0325473 A1* | 10/2019 | Swamidurai | .............. | H04L 9/50 |
| 2020/0162485 A1* | 5/2020 | Jevans | ..................... | H04L 9/50 |
| 2020/0364686 A1* | 11/2020 | Millius | ............... | G06Q 20/204 |
| 2021/0350373 A1* | 11/2021 | Spalding | ............. | G06Q 20/381 |
| 2022/0172200 A1* | 6/2022 | Shen | .................. | G06Q 20/3672 |
| 2022/0207516 A1* | 6/2022 | Kim | .................. | G06Q 20/3676 |
| 2023/0124608 A1* | 4/2023 | Quigley | ............... | G06F 21/602 |
| | | | | 705/65 |

OTHER PUBLICATIONS

Goodell; Digital Currency and Economic Crises; UCL.AC; Aug. 1, 2020; 32 pages.*

* cited by examiner

700

Receive indication that payment instrument has been utilized to purchase at least one of good or service, payment instrument associated with account indicating that reward for usage of payment instrument is to include cryptocurrency
702

Determine cryptocurrency reward amount to apply based on amount of purchase
704

Determine whether cryptocurrency reward amount satisfies preauthorized amount stored in association with pre-funded wallet
706

In response to determining cryptocurrency reward amount satisfies preauthorized amount, facilitating transfer of cryptocurrency reward amount from pre-funded wallet to account
708

In response to determining cryptocurrency reward amount does not satisfy preauthorized amount: acquiring additional cryptocurrency for pre-funded wallet; and facilitating transfer of portion of additional cryptocurrency that corresponds to cryptocurrency reward amount to account
710

Receive indication that payment instrument has been utilized to make purchase, the payment instrument associated with account
802

Determine cryptocurrency reward amount to apply based at least in part on amount of purchase
804

Determine that account indicates cryptocurrency reward amount is to be provided to lending platform instead of wallet associated with account, lending platform configured to facilitate lending of cryptocurrency to entity(ies) in exchange for monetary return
806

Automatically depositing cryptocurrency reward amount into lending platform based at least in part on account indicating cryptocurrency reward amount is to be provided to lending platform
808

FIG. 8

PAYMENT INSTRUMENT CRYPTOCURRENCY REWARDS AND LENDING PLATFORM

PRIORITY

This application claims priority to U.S. Provisional Patent Application No. 63/278,875, filed on Nov. 12, 2021, entitled "Payment Instrument Cryptocurrency Rewards and Lending Platform," the entire contents of which are incorporated herein by reference.

BACKGROUND

Credit card companies offer monetary rewards for using credit cards. Additionally, cryptocurrency is becoming more commonly used. Described herein are improvements in technology and solutions to technical problems that can be used to, among other things, assist in proliferating the use of cryptocurrency.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 7 illustrates an example process associated with a payment instrument cryptocurrency rewards and lending platform.

FIG. 8 illustrates another example process associated with a payment instrument cryptocurrency rewards and lending platform.

DETAILED DESCRIPTION

Figure 1:
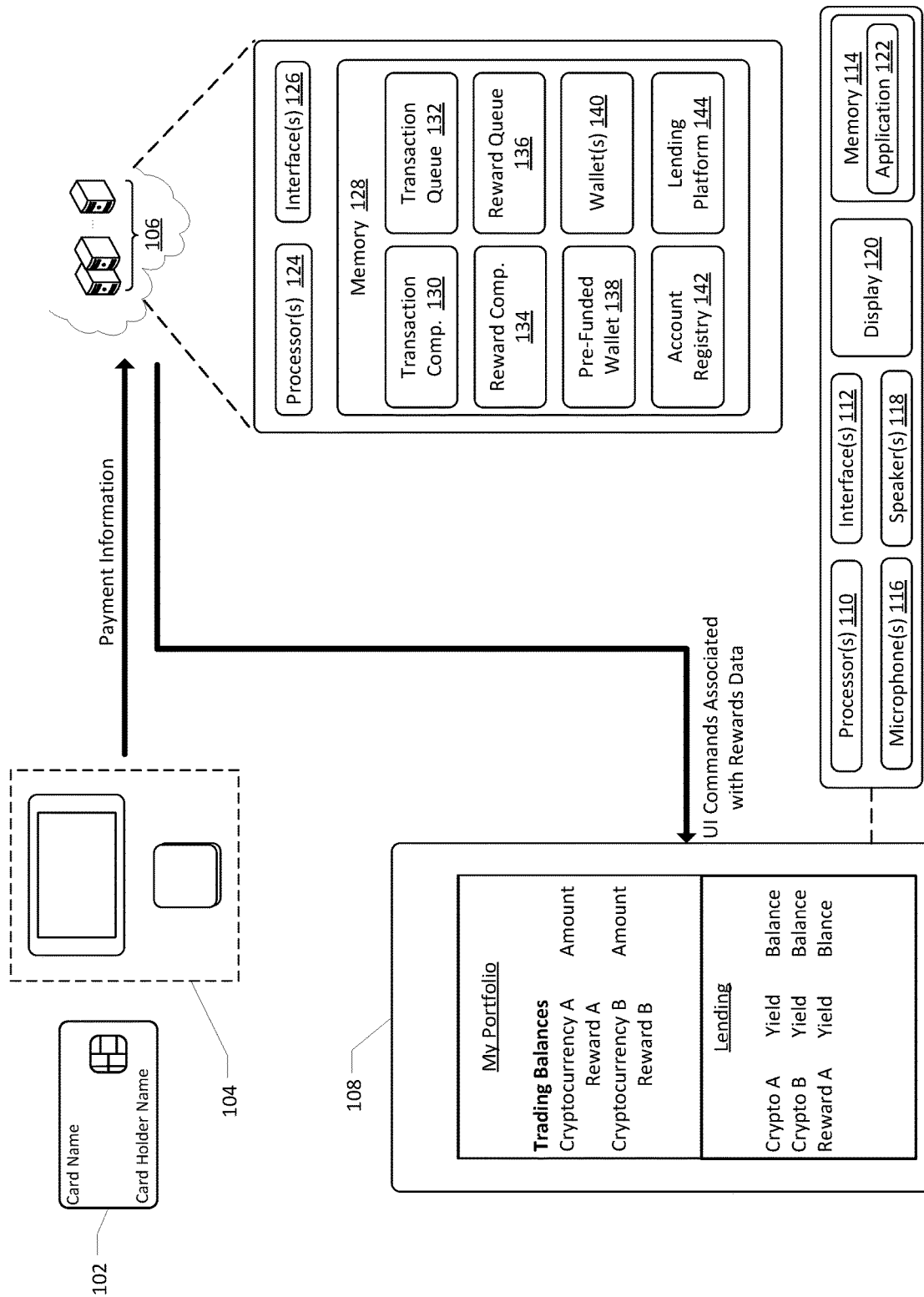
FIG. 1 illustrates an example environment for a payment instrument cryptocurrency rewards and lending platform.

Systems and methods for payment instrument cryptocurrency rewards and lending are disclosed. Take, for example, a situation where a user utilizes a payment instrument as payment for certain goods or services. The user may present the payment instrument, which may be a physical payment instrument like a credit card or a representation of a payment instrument such as biometric information, a portable device, etc., to a merchant for the purchase of goods and/or services. A merchant system, such as a point-of-sale (POS) system may utilize the payment instrument to settle the transaction at issue by communicating with a banking system, a clearinghouse system, etc. In these and other examples, as incentive to utilize the payment instrument, the user may be entitled to receive an award. Utilizing a typical example, the payment instrument may be associated with a 3% cash back incentive. In this example, if a user uses the payment instrument to purchase $1,000 of goods and/or services in a given month, the user may be entitled to $30 in rewards. Generally, the user may receive this reward in the form of a paper check that is cashable by the user to acquire money, or in some examples the user may receive this reward as a direct deposit to a checking account of a bank associated with the user. While these cash-back incentives work, additional and different incentive forms and particularly improving processes for solving the computer-centric problem of providing rewards on a digital asset exchange may be more favorable.

To provide these and other benefits, described herein are techniques to utilize a payment instrument reward and lending platform. To start, a cryptocurrency exchange system may be associated with a payment instrument. For example, the cryptocurrency exchange system may offer the payment instrument in conjunction with one or more other services that are offered. In other examples, the payment instrument may be offered by another entity, but the other entity and the cryptocurrency exchange system may be configured to communicate securely with each other about information concerning use of the payment instrument. In these and other examples, a cryptocurrency reward may be offered as an incentive to utilize the payment instrument such that when a user utilizes the payment instrument to purchase goods and/or services, the cryptocurrency exchange system may be configured to associate a certain amount and/or value of certain cryptocurrency with an account of the user.

To do so, a transaction component of the cryptocurrency exchange system may be configured to receive one or more indications of payments made utilizing the payment instrument. The indications may include a personal account number or otherwise an identifier of the payment instrument, an identifier of the user account associated with the payment instrument, an identifier of the merchant at issue, an amount of the purchase, a date and/or time of the purchase, and/or any other information associated with the purchase. Transaction data such as this may be received for multiple payment instruments associated with multiple accounts utilized in association with the cryptocurrency exchange platform. In examples, the transaction data may be received in real time and/or in near-real time utilizing one or more secure methods, such as through the exchange of tokens, the use of application programming interfaces (APIs), etc.

The transaction component may send data indicating the transactions to a transaction queue. The transaction queue may be configured to at least temporarily store the data associated with the transactions. These initial transactions may be described as "auth" or "authorized" transactions where the amount associated with the transaction is an initial, sometimes estimated, amount attributable to the transaction. In certain examples, this auth amount may differ from a "settlement amount" indicating a final amount of the transaction. To illustrate, if a user presents the payment instrument to purchase a wallet (a physical wallet) from a merchant for $20, the auth amount and the settlement amount will likely both be $20 because the cost of the good at issue did not change and the price for the wallet was determined prior to when the payment instrument was presented. In a different example, the user may present the payment instrument to purchase, say, gasoline prior to pumping the gasoline into a vehicle. In this example where the price is not determined when the payment instrument is presented, the auth amount may be more than what is actually charged for the gasoline. Specifically, in an example, the auth amount may be for $100, which may be set as a maximum amount that may be charged for the gasoline. However, the user may only pump $50 of gasoline, and that $50 may be the settlement amount. In still another example, the user may present the payment instrument at a restaurant to pay for food. When the payment instrument is presented, the amount may be for the cost of the meal. However, thereafter, the user may add a gratuity to the tab, for a total amount that is more than the cost of the meal. In this example, the auth amount may be the original cost of the meal and the settlement amount may be the cost of the meal plus the amount of the gratuity. As such, the transaction queue may be configured to receive and store both the auth amount, which may be received close in time to when the transaction occurs, and the settlement amount, which may occur at a later time.

A rewards component of the cryptocurrency exchange system may be configured to receive the transaction data from the transaction queue and determine a cryptocurrency reward amount to attribute to the user account. For example, say the payment instrument is associated with at least an initial reward amount of 3% cryptocurrency for purchases made using the payment instrument. A given transaction may be for $100, and the rewards component may be configured to utilize transaction data for that $100 transaction to determine that the cryptocurrency reward amount for the transaction is $3 worth of cryptocurrency. The reward component may also be utilized to determine, on the fly, the reward amount for a given transaction. For example, the reward amount may differ based at least in part on one or more factors associated with the transaction, the user account, and/or how the rewards amounts have been utilized previously. Additional details on these factors is provided elsewhere herein, but in examples the factors may include one or more of a cryptocurrency lending threshold being met, a spending threshold being met, whether the rewards have been set to be automatically deposited into a lending platform, a total balance associated with the user account, a portion of total cryptocurrency of an account that is associated with the lending platform, an amount of time that cryptocurrency is associated with the lending platform, earning percentages of various cryptocurrency types, one or more product categories associated with purchases, a number of assets held by the account, recurring orders associated with the account, a number of trades associated with the account, cryptocurrency-to-cryptocurrency conversions of the account, trades associated with the account, and/or one or more other factors determined utilizing machine learning techniques as described herein.

The rewards component may be configured to utilize some or all of the data described above to determine a cryptocurrency reward amount to attribute to a given transaction, the type of cryptocurrency to be rewarded, and a manner in which the reward is to be provided to the user, as described more fully below.

Rewards data indicating the cryptocurrency reward may be sent from the rewards component to a rewards queue. The rewards queue may be configured to at least temporarily store the rewards data for use in providing the cryptocurrency reward to the user. For example, the rewards component and/or another component of the cryptocurrency exchange system may receive the rewards data from the rewards queue and may perform one or more operations for providing the cryptocurrency reward to the user. To do so, the rewards component may query a pre-funded wallet of the cryptocurrency exchange system to determine if enough cryptocurrency funds are available in the pre-funded wallet to provide the cryptocurrency reward amount to the user. In examples where the cryptocurrency funds of the pre-funded wallet are not sufficient and/or are below a threshold amount, the cryptocurrency exchange system may facilitate the purchase of additional cryptocurrency utilizing a pre-funded amount. Facilitating the purchase of the additional cryptocurrency may be performed in a manner generally consistent with the purchase of cryptocurrency utilizing an exchange. In the examples described herein, the cryptocurrency purchased may be based at least in part on user preferences, exchange rates, network availability, transaction processing speed and/or costs, and/or one or more factors that may limit the transactional cost (both monetarily and computationally) of adding cryptocurrency to the pre-funded wallet.

The rewards component may receive confirmation that the pre-funded wallet has sufficient funds to provide the cryptocurrency reward amount to the user and may initiate a process of determine whether the cryptocurrency is to be deposited into a wallet associated with the user account and/or whether the cryptocurrency is to be deposited into an account associated with a lending platform. For example, the user may have provided user input indicating a user preference to have the cryptocurrency rewards amount deposited into a wallet of the user. The wallet may be a digital wallet that associates an account identifier of the user account with cryptocurrency (or other) amounts available to the user account. An example wallet may include indicators that, for a given user account, the user has $1,000 of a first cryptocurrency, $500 of a second cryptocurrency, $300 not associated with cryptocurrency, etc. In this example, the rewards component may facilitate a transaction where the cryptocurrency reward amount is deposited such that the wallet of the user indicates the additional cryptocurrency amount is available to the user. It should be understood that the initiation of the cryptocurrency-related transaction may differ in one or more respects from a concluded cryptocurrency transaction, particularly where a period of time is needed to perform blockchain-related processes and to associate a block in the blockchain at issue with the transaction.

In the prior example, the user preference at issue indicated that the cryptocurrency reward amount was to be deposited to the wallet of the user. However, in other examples, the cryptocurrency reward amount may be deposited into an account associated with the lending platform. For example, the lending platform may be a component of the cryptocurrency exchange system and may be configured to allow users to lend their cryptocurrency to one or more other entities and/or systems in exchange for an earning amount. To illustrate, a user account may have associated therewith certain cryptocurrency and/or money, such as US dollars. The user may provide user input requesting that some or all of the cryptocurrency be taken from the wallet of the user and deposited into one or more accounts associated with the lending platform. The user input may also indicate the entities, systems, or otherwise options for lending the user's cryptocurrency. For example, certain borrowers associated with the lending platform may be associated with certain yields or otherwise rates of return, such as a first entity having an 8% annual rate of return, a second entity having a 7% rate of return, etc. The user may select the option that best fits their portfolio objectives and the cryptocurrency at issue may be transferred from the wallet of the user account to the accounts at issue in the lending platform.

In the rewards example described herein, one or more user preferences may indicate that when cryptocurrency rewards are earned, they are to be deposited directly into the account(s) of the lending platform instead of the wallet of the user account. When this occurs, the reward component may facilitate the transfer of the cryptocurrency reward amount from the pre-funded wallet to the account at issue of the lending platform.

In addition to the above, one or more user interfaces may be generated and configured to display relevant information associated with the payment instrument rewards and lending platform. For example, a first user interface may be configured to present information associated with the wallet of the user account. The information may include a transaction history indicating transactions associated with the payment instrument, amounts of the transactions, a date of the transactions, and/or a reward amount associated with the transactions.

Additionally, the user interface may display indicators of rewards adjustment amounts based on differences between auth amounts and settlement amounts. For example, the transaction component may be configured to receive the settlement amount for given transactions and send transaction data indicating the settlement amount to the transaction queue. The rewards component may query the transaction queue to determine whether the settlement amount for a given transaction is more, the same, or less than the auth amount for the transaction. When the auth amount and the settlement amount is the same, the rewards component may determine to refrain from adjusting rewards amounts. When the auth amount is less than the settlement amount, the rewards component may determine a difference between the cryptocurrency reward amount attributable to the auth amount and the cryptocurrency reward amount attributable to the settlement amount. Data representing the difference may then be stored in the rewards queue and be provided to the user account as described herein. When the auth amount is more than the settlement amount, this indicates that the user account was credited with a cryptocurrency reward amount that was more than they were entitled to. In this example, instead of requiring that the reward amount difference be taken back from the user, the rewards queue may be updated to subtract the difference from another reward amount that has not yet been provided to the user (such as a future reward amount). In this way, the cryptocurrency exchange system may ensure that the user is provided with the correct cryptocurrency reward amount without requiring the user to wait until settlement of a transaction or later to receive the cryptocurrency reward, but also ensures the proper reward amount is provided to the user. These adjustments may be displayed to the user via the user interface(s) described herein.

The user interfaces may also be configured to display user preferences and to receive user input associated with user preferences. For example, preferences associated with cryptocurrency types, preferred distribution wallets, whether automatic deposit into the lending platform is authorized, whether recommendations have been turned on or otherwise should be sent to the user, whether automatic cryptocurrency transfers and/or conversions are to be performed such as based on exchange rates, and/or any other preference associated with the cryptocurrency rewards and/or the lending of cryptocurrency rewards.

By utilizing the techniques described herein, a user may utilize a payment instrument to earn cryptocurrency rewards and to gain interest or other benefits by lending those cryptocurrency rewards via the lending platform. All of this can be done in near-real time from when the user used the payment instrument and these processes, including dynamically determining the earnings amounts for the rewards and/or the lending on the fly. By so doing, barriers to entry into the cryptocurrency market are reduced (requiring in some scenarios very limited involvement by a user) and that user can not only gain the benefits of cryptocurrency exchange rate changes but also earn an amount by lending that cryptocurrency via the lending platform.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates an example environment for a payment instrument cryptocurrency rewards and lending platform. The environment may include, for example, a payment instrument 102, one or more merchant devices 104, a cryptocurrency exchange system 106, and/or a user device 108. The components of each of these devices and/or systems will be described below by way of example. Each of the devices and/or systems may be configured to communicate with each other via one or more networks. Specifically, the payment instrument 102 and/or the merchant devices 104 may be configured to send, directly or indirectly, payment information to the cryptocurrency exchange system. The cryptocurrency exchange system may be configured to perform various processes as described herein and to send user interface commands and/or other commands associated with rewards data to the user device 108.

As to the user device 102, in may include one or more components including, for example, one or more processors 110, one or more network interfaces 112, memory 114, one or more microphones 116, one or more speakers 118, and/or a display 120. The microphones 116 may be configured to receive audio and to generate corresponding audio data. The speakers 118 may be configured to received audio data and to output audio corresponding to that audio data. The displays 120 may be configured to receive data, such as text data and/or image data for example, and to display images and/or other content corresponding to the received device. Additionally, the memory 114 of the user device 102 may include one or more applications 122. The applications 122 may be associated with the cryptocurrency exchange system 106 and/or one or more systems associated with the payment instrument 102, particularly where the payment instrument 102 is not provided by the cryptocurrency exchange system 106. The applications 122 may be configured to display user interfaces for the viewing of content as described herein and/or for the receipt of user input on the user devices 108.

The cryptocurrency exchange system 106 may include one or more components such as, for example, one or more processors 124, one or more network interface 126, and/or memory 128. The memory 128 may include components such as, for example, a transaction component 130, a transaction queue 132, a rewards component 134, a rewards queue 136, a pre-funded wallet 138, one or more wallets 140, an account registry 142, and/or a lending platform 144. Each of these components will be described below.

For example, the transaction component 130 may be configured to receive one or more indications of payments made utilizing the payment instrument 102. The indications may include a personal account number or otherwise an identifier of the payment instrument 102, an identifier of the user account associated with the payment instrument 102, an identifier of the merchant at issue, an amount of the purchase, a date and/or time of the purchase, and/or any other information associated with the purchase. Transaction data such as this may be received for multiple payment instruments 102 associated with multiple accounts utilized in association with the cryptocurrency exchange system 106. In examples, the transaction data may be received in real time and/or in near-real time utilizing one or more secure methods, such as through the exchange of tokens, the use of APIs, etc.

The transaction component 130 may send data indicating the transactions to the transaction queue 132. The transaction queue 132 may be configured to at least temporarily store the data associated with the transactions. These initial transactions may be described as "auth" or "authorized" transactions where the amount associated with the transaction is an initial, sometimes estimated, amount attributable to the transaction. In certain examples, this auth amount may differ from a "settlement amount" indicating a final amount of the transaction, as described in more detail elsewhere herein. The transaction queue 132 may be configured to receive and store both the auth amount, which may be received close in time to when the transaction occurs, and the settlement amount, which may occur at a later time.

The rewards component 134 may be configured to receive the transaction data from the transaction queue 132 and determine a cryptocurrency reward amount to attribute to the user account. For example, say the payment instrument is associated with at least an initial reward amount of 5% cryptocurrency for purchases made using the payment instrument 102. A given transaction may be for $1,000, and the rewards component 134 may be configured to utilize transaction data indicating that $1,000 transaction to determine that the cryptocurrency reward amount for the transaction is $30 worth of cryptocurrency. The reward component 134 may also be utilized to determine, on the fly, the reward amount for a given transaction. For example, the reward amount may differ based at least in part on one or more factors associated with the transaction, the user account, and/or how the rewards amounts have been utilized previously. Additional details on these factors is provided elsewhere herein, but in examples the factors may include one or more of a cryptocurrency lending threshold being met, a spending threshold being met, whether the rewards have been set to be automatically deposited into the lending platform 144, a total balance associated with the user account, a portion of total cryptocurrency of an account that is associated with the lending platform 144, an amount of time that cryptocurrency is associated with the lending platform 144, earning percentages of various cryptocurrency types, one or more product categories associated with purchases, a number of assets held by the account, recurring orders associated with the account, a number of trades associated with the account, cryptocurrency-to-cryptocurrency conversions of the account, trades associated with the account, and/or one or more other factors including factors determined utilizing machine learning techniques as described herein.

The rewards component 134 may be configured to utilize some or all of the data described above to determine a cryptocurrency reward amount to attribute to a given transaction, the type of cryptocurrency to be rewarded, and a manner in which the reward is to be provided to the user.

Rewards data indicating the cryptocurrency reward may be sent from the rewards component 134 to the rewards queue 136. The rewards queue 136 may be configured to at least temporarily store the rewards data for use in providing the cryptocurrency reward to the user. For example, the rewards component 134 and/or another component of the cryptocurrency exchange system 106 may receive the rewards data from the rewards queue 136 and may perform one or more operations for providing the cryptocurrency reward to the user. To do so, the rewards component 134 may query the pre-funded wallet 138 to determine if enough cryptocurrency funds are available in the pre-funded wallet 138 to provide the cryptocurrency reward amount to the user. In examples where the cryptocurrency funds of the pre-funded wallet 138 are not sufficient and/or are below a threshold amount, the cryptocurrency exchange system 106 may facilitate the purchase of additional cryptocurrency utilizing a pre-funded amount. Facilitating the purchase of the additional cryptocurrency may be performed in a manner generally consistent with the purchase of cryptocurrency utilizing an exchange. In the examples described herein, the cryptocurrency purchased may be based at least in part on user preferences, exchange rates, network availability, transaction processing speed and/or costs, and/or one or more factors that may limit the transactional cost (both monetarily and computationally) of adding cryptocurrency to the pre-funded wallet 138.

The rewards component 134 may receive confirmation that the pre-funded wallet 138 has sufficient funds to provide the cryptocurrency reward amount to the user and may initiate a process of determine whether the cryptocurrency is to be deposited into a wallet 140 associated with the user account and/or whether the cryptocurrency is to be deposited into an account associated with the lending platform 144. For example, the user may have provided user input indicating a user preference to have the cryptocurrency rewards amount deposited into a wallet 140 of the user. The wallet 140 may be a digital wallet that associates an account identifier of the user account with cryptocurrency (or other) amounts available to the user account. An example wallet may include indicators that, for a given user account, the user has $1,000 of a first cryptocurrency, $500 of a second cryptocurrency, $300 not associated with cryptocurrency, etc. In this example, the rewards component 134 may facilitate a transaction where the cryptocurrency reward amount is deposited such that the wallet 140 of the user indicates the additional cryptocurrency amount is available to the user. It should be understood that the initiation of the cryptocurrency-related transaction may differ in one or more respects from a concluded cryptocurrency transaction, particularly where a period of time is needed to perform blockchain-related processes and to associate a block in the blockchain at issue with the transaction.

The account registry 142 may be configured to store data associated with the user accounts associated with the cryptocurrency exchange system 106. This user account data may include, by way of example, user account identifiers, identifiers of user devices 108 associated with the user accounts, user preference information, user identifiers, user information, data on the use of the payment instrument 102, data on the user of the merchant devices 104, data on the use of cryptocurrency rewards, data on the lending on cryptocurrency via the lending platform 144, etc.

With respect to the user preferences, a given user preference may indicate that the cryptocurrency reward amount was to be deposited to the wallet 140 of the user, as described above. However, in other examples, the cryptocurrency reward amount may be deposited into an account associated with the lending platform 144. For example, the lending platform 144 may be a component of the cryptocurrency exchange system 106 and may be configured to allow users to lend their cryptocurrency to one or more other entities and/or systems in exchange for an earning amount. To illustrate, a user account may have associated therewith certain cryptocurrency and/or money, such as US dollars. The user may provide user input requesting that some or all of the cryptocurrency be taken from the wallet 140 of the user and deposited into one or more accounts associated with the lending platform 144. The user input may also indicate the entities, systems, or otherwise options for lending the user's cryptocurrency. For example, certain borrowers associated with the lending platform 144 may be associated with certain yields or otherwise rates of return, such as a first entity having an 8% annual rate of return, a second entity having a 7% rate of return, etc. The user may select the option that best fits their portfolio objectives and the cryptocurrency at issue may be transferred from the wallet 140 of the user account to the accounts at issue in the lending platform 144.

In the rewards example described herein, one or more user preferences may indicate that when cryptocurrency rewards are earned, they are to be deposited directly into the account(s) of the lending platform 144 instead of the wallet 140 of the user account. When this occurs, the reward component 134 may facilitate the transfer of the cryptocurrency reward amount from the pre-funded wallet 138 to the account at issue of the lending platform 144.

In addition to the above, one or more user interfaces may be generated and configured to display relevant information associated with the payment instrument rewards and lending platform 144. For example, a first user interface may be configured to present information associated with the wallet 140 of the user account. The information may include a transaction history indicating transactions associated with the payment instrument 102, amounts of the transactions, date of the transactions, and/or reward amounts associated with the transactions. Additionally, the user interface may display indicators of rewards adjustment amounts based on differences between auth amounts and settlement amounts.

For example, the transaction component 130 may be configured to receive the settlement amount for given transactions and send transaction data indicating the settlement amount to the transaction queue 132. The rewards component 134 may query the transaction queue 132 to determine whether the settlement amount for a given transaction is more, the same, or less than the auth amount for the transaction. When the auth amount and the settlement amount is the same, the rewards component 134 may determine to refrain from adjusting rewards amounts. When the auth amount is less than the settlement amount, the rewards component 134 may determine a difference between the cryptocurrency reward amount attributable to the auth amount and the cryptocurrency reward amount attributable to the settlement amount. Data representing the difference may then be stored in the rewards queue 136 and be provided to the user account as described herein. When the auth amount is more than the settlement amount, this indicates that the user account was credited with a cryptocurrency reward amount that was more than the user was entitled to. In this example, instead of requiring that the reward amount difference be provided back from the user, the rewards queue 136 may be updated to subtract the difference from another reward amount that has not yet been provided to the user. In this way, the cryptocurrency exchange system 106 may ensure that the user is provided with the correct cryptocurrency reward amount without requiring the user to wait until settlement of a transaction or later to receive the cryptocurrency reward, but also ensures the proper reward amount is provided to the user. These adjustments may be displayed to the user via the user interface(s) described herein.

The user interfaces may also be configured to display user preferences and to receive user input associated with user preferences. For example, preferences associated with cryptocurrency types, preferred distribution wallets, whether automatic deposit into the lending platform 144 is authorized, whether recommendations have been turned on or otherwise should be sent to the user, whether automatic cryptocurrency transfers and/or conversions are to be performed such as based on exchange rates, and/or any other preference associated with the cryptocurrency rewards and/or the lending of cryptocurrency rewards.

As shown in FIG. 1, several of the components of the cryptocurrency exchange system 106 and/or the other systems and devices, and the associated functionality of those components as described herein, may be performed by one or more of the other systems and/or by the user devices 108. Additionally, or alternatively, some or all of the components and/or functionalities associated with the user devices 108 may be performed by the cryptocurrency exchange system 106.

It should be noted that the exchange of data and/or information as described herein may be performed only in situations where a user has provided consent for the exchange of such information. For example, a user may be provided with the opportunity to opt in and/or opt out of data exchanges between devices and/or with the systems and/or for performance of the functionalities described herein. Additionally, when one of the devices is associated with a first user account and another of the devices is associated with a second user account, user consent may be obtained before performing some, any, or all of the operations and/or processes described herein.

As used herein, a processor, such as processor(s) 110 and/or 124, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 110 and/or 124 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 110 and/or 124 may possess its own local memory, which also may store program components, program data, and/or one or more operating systems.

The memory 114 and/or 128 may include volatile and nonvolatile memory, removable and non-removable media implemented in any method or technology for storage of information, such as computer-readable instructions, data structures, program component, or other data. Such memory 114 and/or 128 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 114 and/or 128 may be implemented as computer-readable storage media ("CRSM"), which may be any available physical media accessible by the processor(s) 110 and/or 124 to execute instructions stored on the memory 114 and/or 128. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 114 and/or 128, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project: other UNIX or UNIX-like variants: a variation of the Linux operating system as promulgated by Linus Torvalds: the FireOS operating system from Amazon.com Inc. of Seattle, Washington, USA: the Windows operating system from Microsoft Corporation of Redmond, Washington, USA: LynxOS as promulgated by Lynx Software Technologies, Inc. of San Jose, California: Operating System Embedded (Enea OSE) as promulgated by ENEA AB of Sweden; and so forth.

The network interface(s) 112 and/or 126 may enable messages between the components and/or devices shown in system 100 and/or with one or more other remote systems, as well as other networked devices. Such network interface(s) 112 and/or 126 may include one or more network interface controllers (NICs) or other types of transceiver devices to send and receive messages over the network.

For instance, each of the network interface(s) 112 and/or 126 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 112 and/or 126 may include a wide area network (WAN) component to enable message over a wide area network.

In some instances, the cryptocurrency exchange system 106 or portions thereof may be local to an environment associated the user device 108. In some instances, some or all of the functionality of the cryptocurrency exchange system 106 may be performed by the user device 108. Also, while various components of the cryptocurrency exchange system 106 have been labeled and named in this disclosure and each component has been described as being configured to cause the processor(s) to perform certain operations, it should be understood that the described operations may be performed by some or all of the components and/or other components not specifically illustrated.

Figure 2:
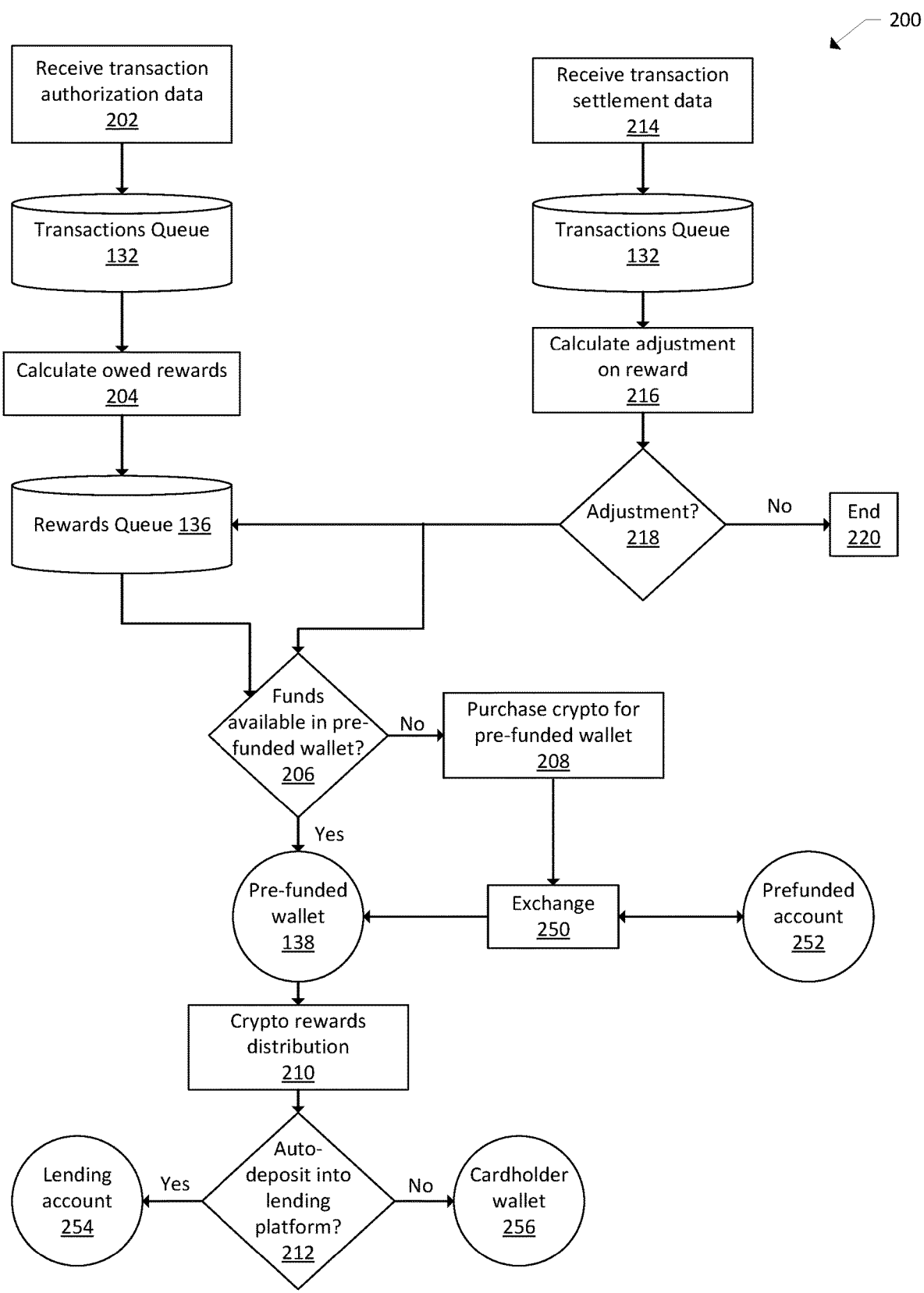
FIG. 2 illustrates a flow diagram of an example process to provide cryptocurrency as a reward type for use of payment instruments.

FIG. 2 illustrates processes for payment instrument rewards and lending platforms. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1 and 3-11, although the processes may be implemented in a wide variety of other environments, architectures and systems.

FIG. 2 illustrates a flow diagram of an example process 200 to provide cryptocurrency as a reward type for use of payment instruments. The order in which the operations or steps are described is not intended to be construed as a limitation, and any number of the described operations may be combined in any order and/or in parallel to implement process 200.

At block 202, the process 200 may include receiving transaction authorization data. For example, a transaction component of a cryptocurrency exchange system may be configured to receive one or more indications of payments made utilizing the payment instrument. The indications may include a personal account number or otherwise an identifier of the payment instrument, an identifier of the user account associated with the payment instrument, an identifier of the merchant at issue, an amount of the purchase, a date and/or time of the purchase, and/or any other information associated with the purchase. Transaction data such as this may be received for multiple payment instruments associated with multiple accounts utilized in association with the cryptocurrency exchange platform. In examples, the transaction data may be received in real time and/or in near-real time utilizing one or more secure methods, such as through the exchange of tokens, the use of application programming interfaces (APIs), etc.

The transaction component may send data indicating the transactions to a transaction queue 132. The transaction queue 132 may be configured to at least temporarily store the data associated with the transactions. These initial transactions may be described as "auth" or "authorized" transactions where the amount associated with the transaction is an initial, sometimes estimated, amount attributable to the transaction. In certain examples, this auth amount may differ from a "settlement amount" indicating a final amount of the transaction. To illustrate, if a user presents the payment instrument to purchase a wallet (a physical wallet) from a merchant for $20, the auth amount and the settlement amount will likely both be $20 because the cost of the goods and/or services did not change and the price for the wallet was determined prior to when the payment instrument was presented. In a different example, the user may present the payment instrument to purchase, say, gasoline prior to pumping the gasoline into a vehicle. In this example where the price is not determined when the payment instrument is presented, the auth amount may be more than what is actually charged for the gasoline. Specifically, in an example, the auth amount may be for $100, which may be set as a maximum amount that may be charged for the gasoline. However, the user may only pump $50 of gasoline, and that $50 may be the settlement amount. In still another example, the user may present the payment instrument at a restaurant to pay for food. When the payment instrument is presented, the amount may be for the cost of the meal. However, thereafter, the user may add a gratuity to the tab, for a total amount that is more than the cost of the meal. In this example, the auth amount may be the original cost of the meal and the settlement amount may be the cost of the meal plus the amount of the gratuity. As such, the transaction queue 132 may be configured to receive and store both the auth amount, which may be received close in time to when the transaction occurs, and the settlement amount, which may occur at a later time.

At block 204, the process 200 may include calculating an amount of owed cryptocurrency rewards. For example, a rewards component of the cryptocurrency exchange system may be configured to receive the transaction data from the transaction queue 132 and determine a cryptocurrency reward amount to attribute to the user account. For example, say the payment instrument is associated with at least an initial reward amount of 3% cryptocurrency for purchases made using the payment instrument. A given transaction may be for $100, and the rewards component may be configured to utilize transaction data indicating that $100 transaction to determine that the cryptocurrency reward amount for the transaction is $3 worth of cryptocurrency. The reward component may also be utilized to determine, on the fly, the reward amount for a given transaction. For example, the reward amount may differ based at least in part on one or more factors associated with the transaction, the user account, and/or how the rewards amounts have been utilized previously. The rewards component may be configured to utilize some or all of the data described above to determine a cryptocurrency reward amount to attribute to a given transaction, the type of cryptocurrency to be rewarded, and a manner in which the reward is to be provided to the user.

Rewards data indicating the cryptocurrency reward may be sent from the rewards component to a rewards queue 136. The rewards queue 136 may be configured to at least temporarily store the rewards data for use in providing the cryptocurrency reward to the user. For example, the rewards component and/or another component of the cryptocurrency exchange system may receive the rewards data from the rewards queue 136 and may perform one or more operations for providing the cryptocurrency reward to the user.

At block 206, the process 200 may include determining whether there are sufficient funds available in a pre-funded wallet with respect to the cryptocurrency rewards amount. To do so, the rewards component may query a pre-funded wallet 138 of the cryptocurrency exchange system to determine if enough cryptocurrency funds are available in the pre-funded wallet 138 to provide the cryptocurrency reward amount to the user. For example, the pre-funded wallet 138 may be configured to store a given range of cryptocurrency value and/or to store at least a threshold amount of cryptocurrency, etc. Additionally, when the value of the pre-funded wallet 138 drops below a threshold amount, it may be determined that the pre-funded wallet does not contain sufficient funds, even when the funds still in the pre-funded wallet are more than the cryptocurrency reward amount.

In examples where there are insufficient funds available in the pre-funded wallet, the process 200 may include, at block 208, purchasing additional cryptocurrency for the pre-funded wallet. For example, an exchange 250 may facilitate the purchase of additional cryptocurrency utilizing a pre-funded account 252. Facilitating the purchase of the additional cryptocurrency may be performed in a manner generally consistent with the purchase of cryptocurrency utilize the exchange 250. In the examples described herein, the cryptocurrency purchased may be based at least in part on user preferences, exchange rates, network availability, transaction processing speed and/or costs, and/or one or more factors that may limit the transactional cost (both monetarily and computationally) of adding cryptocurrency to the pre-funded wallet 138.

In examples where there is sufficient funds available in the pre-funded wallet, the process 200 may include, at block 210, causing a cryptocurrency reward distribution to be made from the pre-funded wallet 138 to the user as described below. For example, the rewards component may receive confirmation that the pre-funded wallet 138 has sufficient funds to provide the cryptocurrency reward amount to the user and may initiate a process of determining whether the cryptocurrency is to be deposited into a wallet 256 associated with the user account and/or whether the cryptocurrency is to be deposited into an account 254 associated with a lending platform.

At block 212, the process 200 may include determining whether one or more user preferences indicate that the cryptocurrency reward amount should be automatically deposited into an account associated with a lending platform. For example, the user may have provided user input indicating a user preference to have the cryptocurrency rewards amount deposited into a wallet of the user. However, in other examples, the cryptocurrency reward amount may be deposited into an account associated with the lending platform when the user preferences indicate a preference to do so.

In examples where the user preferences indicate the cryptocurrency reward amount should be automatically deposited, the process 200 may include depositing the cryptocurrency reward amount into an account 254 associated with the lending platform. For example, the lending platform may be a component of the cryptocurrency exchange system and may be configured to allow users to lend their cryptocurrency to one or more other entities and/or systems in exchange for an earning amount. To illustrate, a user account may have associated therewith certain cryptocurrency and/or money, such as US dollars. The user may provide user input requesting that some or all of the cryptocurrency be taken from the wallet 256 of the user and deposited into one or more accounts 254 associated with the lending platform. The user input may also indicate the entities, systems, or otherwise options for lending the user's cryptocurrency. For example, certain borrowers associated with the lending platform may be associated with certain yields or otherwise rates of return, such as a first entity having an 8% annual rate of return, a second entity having a 7% rate of return, etc. The user may select the option that best fits their portfolio objectives and the cryptocurrency at issue may be transferred from the wallet 256 of the user account to the accounts 254 at issue in the lending platform.

In the rewards example described herein, one or more user preferences may indicate that when cryptocurrency rewards are earned, they are to be deposited directly into the account(s) of the lending platform instead of the wallet of the user account. When this occurs, the reward component may facilitate the transfer of the cryptocurrency reward amount from the pre-funded wallet to the account at issue of the lending platform.

In examples where the user preferences indicate the cryptocurrency reward amount should not be automatically deposited, or the user preferences otherwise do not indicate affirmative user selection of the option to automatically deposit into the lending platform, the process 200 may include depositing the cryptocurrency reward amount into the wallet 256 of the user. The wallet 256 may be a digital wallet that associates an account identifier of the user account with cryptocurrency (or other) amounts available to the user account. An example wallet 256 may include indicators that, for a given user account, the user has $1,000 of a first cryptocurrency, $500 of a second cryptocurrency, $300 not associated with cryptocurrency, etc. In this example, the rewards component may facilitate a transaction where the cryptocurrency reward amount is deposited such that the wallet 256 of the user indicates the additional cryptocurrency amount is available to the user. It should be understood that the initiation of the cryptocurrency-related transaction may differ in one or more respects from a concluded cryptocurrency transaction, particularly where a period of time is needed to perform blockchain-related processes and to associate a block in the blockchain at issue with the transaction.

Thereafter, at block 214, the process 200 may include receiving transaction settlement data. For example, the transaction component may be configured to receive the settlement amount for given transactions and send transaction data indicating the settlement amount to the transaction queue.

At block 216, the process 200 may include calculating an adjustment on the reward from the auth data. For example, the rewards component may query the transaction queue to determine whether the settlement amount for a given transaction is more, the same, or less than the auth amount for the transaction.

At block 218, the process 200 may include determining whether an adjustment to the cryptocurrency reward amount should be made. In examples where an adjustment is determined not to be made, the process 200 may end at block 220. Here, when the auth amount and the settlement amount is the same, the rewards component may determine to refrain from adjusting rewards amounts.

In examples where an adjustment is determined to be merited, the process 200 may include determining whether the adjustment is a positive or negative adjustment. If negative, data indicating the negative adjustment may be sent to the rewards queue 136 or another component of the system. For example, when the auth amount is more than the settlement amount, this indicates that the user account was credited with a cryptocurrency reward amount that was more than they were entitled to. In this example, instead of requiring that the reward amount difference be provided back from the user, the rewards queue or another component of the system may be updated to subtract the difference from another reward amount that has not yet been provided to the user.

In examples where the adjustment is positive, the process 200 may proceed back to block 206, as described above. For example, when the auth amount is less than the settlement amount, the rewards component may determine a difference between the cryptocurrency reward amount attributable to the auth amount and the cryptocurrency reward amount attributable to the settlement amount. Data representing the difference may then be stored in the rewards queue 136 or another component of the system and be provided to the user account as described herein. In this way, the cryptocurrency exchange system may ensure that the user is provided with the correct cryptocurrency reward amount without requiring the user to wait until settlement of a transaction or later to receive the cryptocurrency reward, but also ensures the proper reward amount is provided to the user. These adjustments may be displayed to the user via the user interface(s) described herein.

In addition to the above, other adjustments may be made to the cryptocurrency reward amount(s) described above. For example, product returns and similar transactions may be considered when determining whether a particular user is entitled to more or less rewards than originally provided with respect to the auth amount. In these examples, the auth amount and the settlement amount may be the same, but another transaction (e.g., the return transaction) may be received. The system may correlate the original transaction with the return transaction utilizing account data, product data, a transaction identifier, or other data, and the system may determine whether the subsequent transaction results in a positive or negative adjustment to the amount of rewards provided to the user. A similar process may occur when a given transaction is associated with multiple clearings. In these and other examples, an identifier or other data indicating that the multiple clearings are associated with the same purchase and/or transaction may be utilized to determine, for each clearing, whether an adjustment should be made. Additionally, in some examples, a given clearing may be determined to not be final or otherwise may be considered transitory. In these examples, the system may utilize such an indication to refrain from adjusting rewards amounts until another clearing is performed with respect to the transaction.

Figure 3:
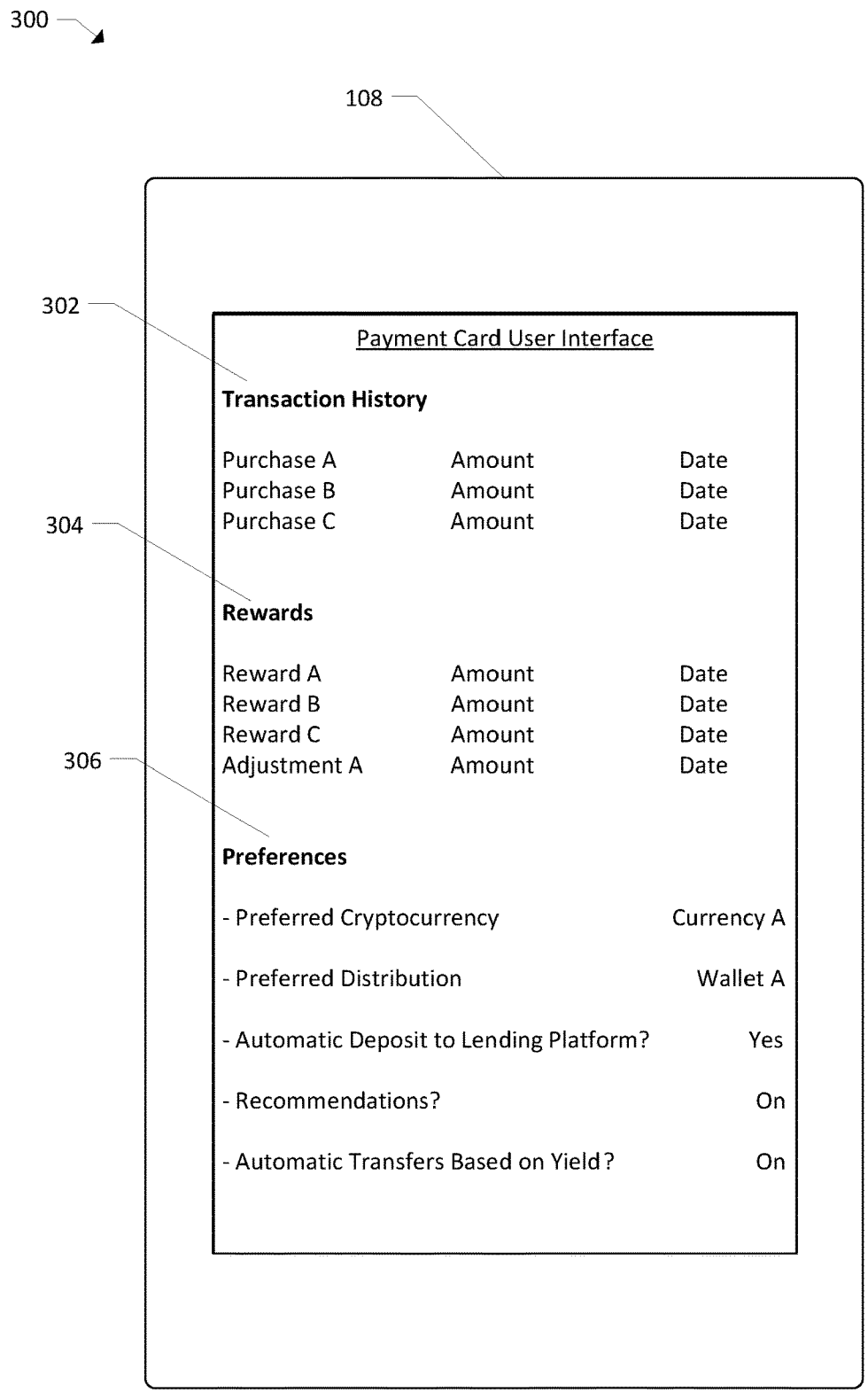
FIG. 3 illustrates an example user interface displaying functionality associated with cryptocurrency rewards and user preferences.

FIG. 3 illustrates an example user interface 300 displaying functionality associated with cryptocurrency rewards and user preferences. The user interface 300 may be displayed on a user device, which may be the same or similar to the user device 108 described with respect to FIG. 1.

Example components of the user interface 300 may include a transaction history 302, a rewards section 304, and/or a preferences section 306. The transaction history 302 may indicate transactions associated with the payment instrument at issue, amounts of the transactions, a date of the transactions, etc. Using FIG. 3 as an example, the transaction history 302 for the user account at issue includes three transactions (Purchases A-C), each having an associated amount and an associated date. The rewards section 304 may indicate reward amounts associated with the transactions. Using FIG. 3 as an example, the rewards section 304 may include multiple reward indicators (Rewards A-C), an amount of each award, and/or a date when the reward was distributed to the user. In examples, a link or other association between a transaction and a reward may be provided. Additionally, the user interface 300 may display indicators of rewards adjustment amounts based on differences between auth amounts and settlement amounts. This may be displayed in the rewards section 304. As shown in FIG. 3, the adjustment includes Adjustment A and the associated amount and date of the adjustment.

The preferences section 306 may include details about one or more user preferences as well as to provide functionality to receive user input associated with user preferences. For example, preferences may include cryptocurrency types, preferred distribution wallets, whether automatic deposit into the lending platform is authorized, whether recommendations have been turned on or otherwise should be sent to the user, whether automatic cryptocurrency transfers and/or conversions are to be performed such as based on exchange rates, and/or any other preference associated with the cryptocurrency rewards and/or the lending of cryptocurrency rewards. As shown in FIG. 3, for this account, the user preferences indicate a preference for Cryptocurrency A, a preferred distribution to Wallet A, an indication that automatic deposit into the lending platform is enabled, that recommendations have been "turned on," and that automatic transfer based on exchange rates have been enabled. It should be understood that the user preferences shown in FIG. 3 are provided by way of example and are not limiting. Any user preference associated with cryptocurrency rewards and/or the lending platform may be provided.

Figure 4:
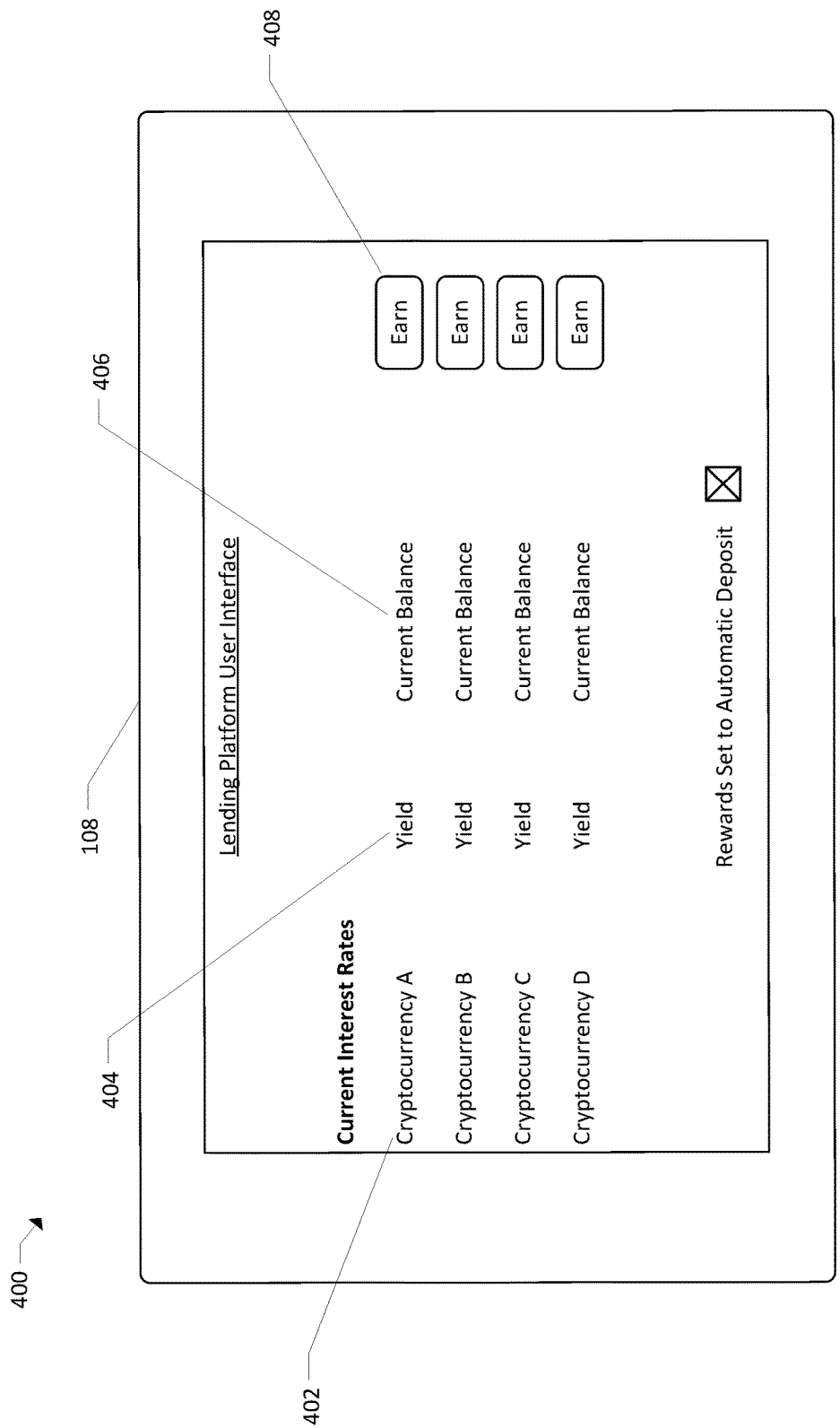
FIG. 4 illustrates an example user interface displaying functionality associated with a lending platform.

FIG. 4 illustrates an example user interface 400 displaying functionality associated with a lending platform. The user interface 400 may be displayed on a user device, which may be the same or similar to the user device 108 described with respect to FIG. 1.

Example components of the user interface 400 may include cryptocurrency indicators 402, yield indicators 404, current balances 406, and/or options 408 for lending cryptocurrency. For example, the lending platform may be a component of the cryptocurrency exchange system and may be configured to allow users to lend their cryptocurrency to one or more other entities and/or systems in exchange for an earning amount. To illustrate, a user account may have associated therewith certain cryptocurrency and/or money, such as US dollars. The user may provide user input requesting that some or all of the cryptocurrency be taken from the wallet of the user and deposited into one or more accounts associated with the lending platform. The user input may also indicate the entities, systems, or otherwise options for lending the user's cryptocurrency. For example, certain borrowers associated with the lending platform may be associated with certain yields or otherwise rates of return, such as a first entity having an 8% annual rate of return, a second entity having a 7% rate of return, etc. The user may select the option that best fits their portfolio objectives and the cryptocurrency at issue may be transferred from the wallet of the user account to the accounts at issue in the lending platform.

As shown in FIG. 4, the cryptocurrency indicators 402 may show the cryptocurrency currently set up to be associated with the lending platform. Here, the cryptocurrency indicators are Cryptocurrency A-D. Each of these cryptocurrency indicators 402 may have an associated yield indicator 404. The yield indicator, in examples, may indicate a percentage (such as an annual percentage) of interest or otherwise earnings from lending cryptocurrency. Additionally the balance indicators 406 may indicate how much cryptocurrency has been lent for the various cryptocurrency types. The options 408 may be selectable to cause one or more forms to be displayed for inputting information to lend cryptocurrency. The forms may include bank account information (particularly where the user does not have cryptocurrency on the exchange), identifying information, terms, etc. In examples where cryptocurrency rewards are provided as described herein, an indicator of whether rewards are being automatically deposited into the lending platform may be provided along with functionality, such as a check box, for toggling between enabling and disabling automatic deposits.

Figure 5:
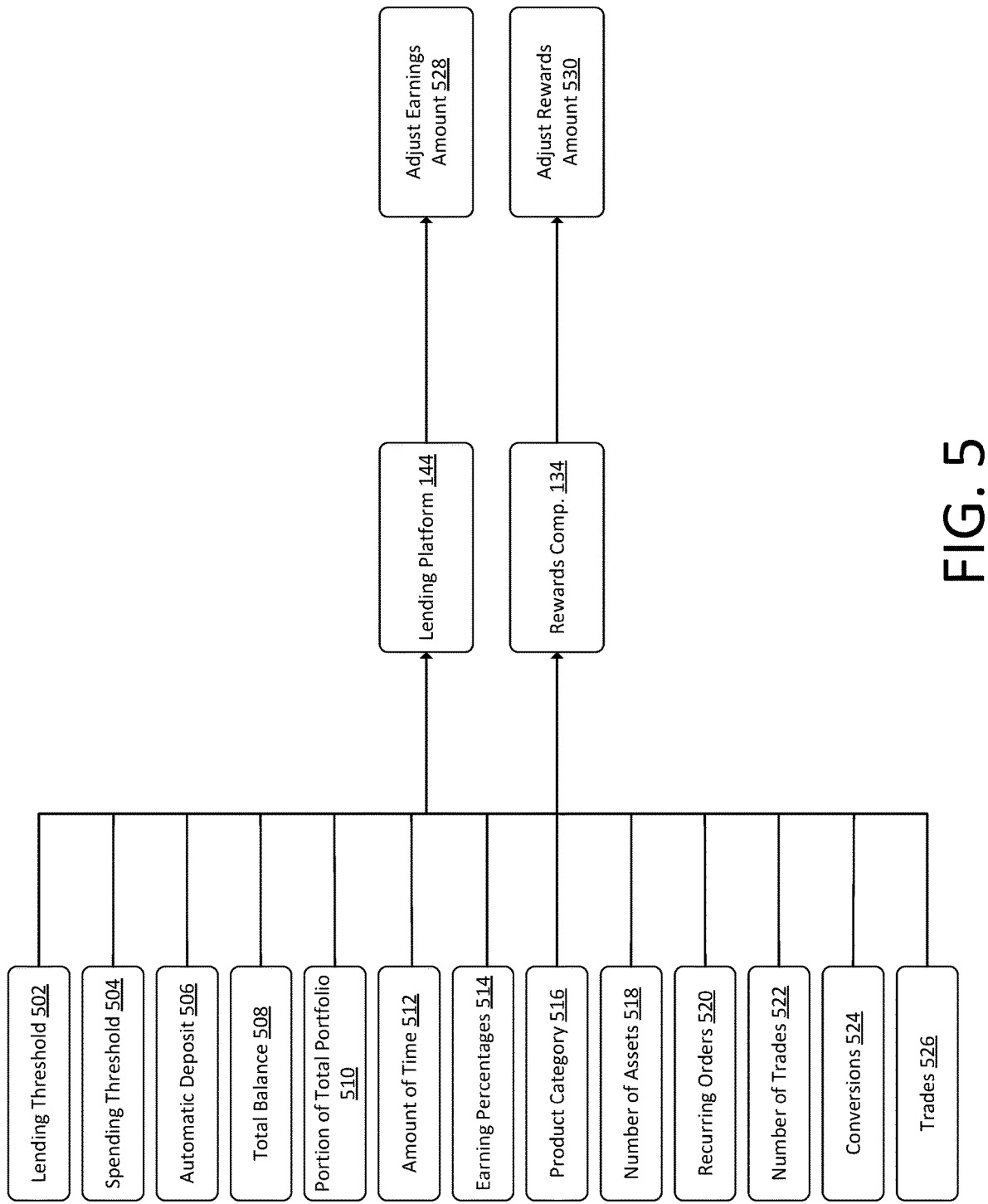
FIG. 5 illustrates a conceptual diagram of example factors that may impact earnings amounts as described herein.

FIG. 5 illustrates a conceptual diagram of example factors that may impact earnings amounts as described herein. For example, various types of data may be utilized to determine what an earning amount on the cryptocurrency reward is to be set to. The earning amount may apply to the amount of cryptocurrency reward for a given payment. In other examples, the earning amount may apply to the yield associated with lending the cryptocurrency on the lending platform.

The data types that may impact the earning amount may include, but are not limited to, a lending threshold 502, a spending threshold 504, an automatic deposit indication 506, total balance 508, a portion 510 of the total portfolio associated with the lending platform, an amount of time 512 cryptocurrency has been associated with the lending platform, an earning percentage 514 associated with the cryptocurrency, a product category 516, a number of assets 518, recurring orders 520, a number of trades 522, conversions 524, trades 526, and/or one or more other factors. To illustrate, a determination may be made by a rewards component 134 and/or a lending platform 144 as to how one or more of these factors influence the earning amount and/or rewards amount. For example, the determinations may include determining whether the cryptocurrency reward amount is deposited into the lending platform instead of a wallet associated with the account. The determinations may also include determining a total balance of cryptocurrency associated with the account that is being utilized by the lending platform and determining that the total balance satisfies a threshold balance. The determinations may also include determining a portion of cryptocurrency associated with the account that is being utilized by the lending platform and determining that the portion of cryptocurrency is at least a threshold amount of total cryptocurrency associated with the account. The determinations may also include determining an amount of time that the cryptocurrency reward amount has been utilized by the lending platform without being transferred to the wallet and determining that the amount of time is at least a threshold amount of time. The determinations may also include determining, at a time when the purchase occurs, earning percentages associated with types of cryptocurrency associated with the lending platform and receiving input data indicating a selection of a type of cryptocurrency from the types of cryptocurrency. The determinations may also include determining a product category associated with the purchase and determining an earning amount associated with the product category. The determinations may also include determining a number of cryptocurrency assets associated with the account being utilized by the lending platform and determining the number of the cryptocurrency assets satisfies a threshold number of cryptocurrency assets. The determinations may also include determining a number of recurring cryptocurrency orders set up in association with the account and determining that the number of the recurring cryptocurrency orders satisfies a threshold number of orders. The determinations may also include determining a number of cryptocurrency trades made in association with the account during a predefined amount of time and determining that the number of cryptocurrency trades satisfies a threshold number of cryptocurrency trades. The determinations may also include determining that a cryptocurrency-to-cryptocurrency conversion was performed in association with the account. The determinations may also include determining that a cryptocurrency trade associated with the account was performed for a cryptocurrency amount that is at least a threshold amount.

Some or all of these determinations may be utilized to determine an adjusted earning amount 528 to associate with earnings of the user account and/or an adjusted rewards amount 530 to associate with rewards for the user account. Some or all of these factors may be surfaced to the user, including as a recommendation, to boost earning and/or reward potential from cryptocurrency rewards. The factors may also be changed, removed, and/or added over time, particularly where machine learning models are utilized (described below) to determine which factors influence increased use of the cryptocurrency exchange system and/or that bring the most value to users.

Figure 6:
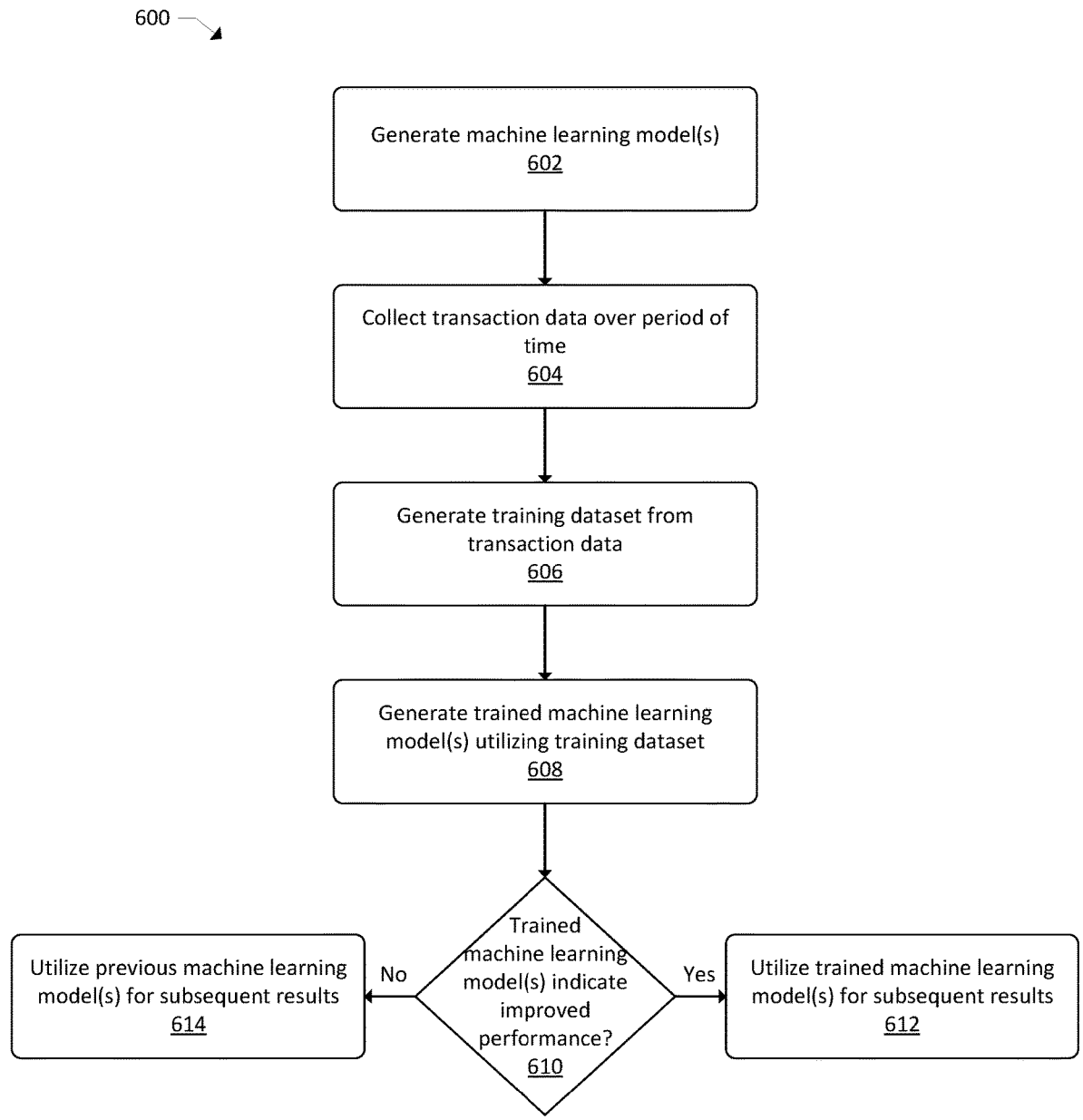
FIG. 6 illustrates a flow diagram of an example process for training and utilizing one or more machine learning models to perform operations as described herein.

FIGS. 6-8 illustrate processes for payment instrument rewards and lending platforms. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-5 and 9-11, although the processes may be implemented in a wide variety of other environments, architectures and systems.

FIG. 6 illustrates a flow diagram of an example process 600 for training and utilizing one or more machine learning models to perform operations as described herein. The order in which the operations or steps are described is not intended to be construed as a limitation, and any number of the described operations may be combined in any order and/or in parallel to implement process 600.

At block 602, the process 600 may include generating one or more machine learning models. For example, the machine learning models may utilize predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the layers and/or models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases, and may be utilized to predict trends and behavior patterns. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter predictive modelling may be performed to generate accurate predictive models.

At block 604, the process 600 may include collecting transaction data over a period of time. The transaction data may include information associated with payment card transactions, reward amounts, user preferences, settlement amounts, reward amounts in a reward queue, pre-funded wallet metrics, cryptocurrency exchange occurrence and/or rates, metrics on automatic deposits into the lending platform, metrics on automatic deposits into user wallets, cryptocurrency type selections, earning amounts, and/or any other data described herein.

At block 606, the process 600 may include generating a training dataset from the transaction data. Generation of the training dataset may include formatting the transaction data into input vectors for the machine learning model to intake, as well as associating the various data with the transaction outcomes.

At block 608, the process 600 may include generating one or more trained machine learning models utilizing the training dataset. Generation of the trained machine learning models may include updating parameters and/or weightings and/or thresholds utilized by the models to generate recommendations and/or to perform adjustments of earning amounts as described herein. It should be understood that the trained machine learning models may be configured to determine factors for recommendations associated with adjusted earning amounts, cryptocurrency types, whether to deposit rewards into a lending platform, products to purchase, payment instruments to use, etc.

At block 610, the process 600 may include determining whether the trained machine learning models indicate improved performance metrics. For example, a testing group may be generated where the outcomes of the recommendations and/or adjustments are known but not to the trained machine learning models. The trained machine learning models may generate the recommendations and/or perform the adjustment operations, which may be compared to the known results to determine whether the results of the trained machine learning model produce a superior result than the results of the machine learning model prior to training.

In examples where the trained machine learning models indicate improved performance metrics, the process 600 may include, at block 612, utilizing the trained machine learning models for generating subsequent results.

In examples where the trained machine learning models do not indicate improved performance metrics, the process 600 may include, at block 614, utilizing the previous iteration of the machine learning models for generating subsequent results. It should be understood that while several examples of how machine learning models may be utilized are described in FIG. 6, the machine learning models may be utilized to perform any of the processes described herein and/or to make any of the determinations described herein.

FIG. 7 illustrates an example process 700 associated with a payment instrument cryptocurrency rewards and lending platform. The order in which the operations or steps are described is not intended to be construed as a limitation, and any number of the described operations may be combined in any order and/or in parallel to implement process 700.

At block 702, the process 700 may include receiving an indication that a payment instrument has been utilized to purchase at least one of a good or a service, the payment instrument associated with an account indicating that a reward for usage of the payment instrument is to include cryptocurrency. For example, a transaction component of a cryptocurrency exchange system may be configured to receive one or more indications of payments made utilizing the payment instrument. The indications may include a personal account number or otherwise an identifier of the payment instrument, an identifier of the user account associated with the payment instrument, an identifier of the merchant at issue, an amount of the purchase, a date and/or time of the purchase, and/or any other information associated with the purchase. Transaction data such as this may be received for multiple payment instruments associated with multiple accounts utilized in association with the cryptocurrency exchange platform. In examples, the transaction data may be received in real time and/or in near-real time utilizing one or more secure methods, such as through the exchange of tokens, the use of application programming interfaces (APIs), etc.

At block 704, the process 700 may include determining a cryptocurrency reward amount to apply based on an amount of the purchase. For example, a rewards component of the cryptocurrency exchange system may be configured to receive the transaction data from the transaction queue and determine a cryptocurrency reward amount to attribute to the user account. For example, say the payment instrument is associated with at least an initial reward amount of 3% cryptocurrency for purchases made using the payment instrument. A given transaction may be for $100, and the rewards component may be configured to utilize transaction data indicating that $100 transaction to determine that the cryptocurrency reward amount for the transaction is $3 worth of cryptocurrency. The reward component may also be utilized to determine, on the fly, the reward amount for a given transaction. For example, the reward amount may differ based at least in part on one or more factors associated with the transaction, the user account, and/or how the rewards amounts have been utilized previously. The rewards component may be configured to utilize some or all of the data described above to determine a cryptocurrency reward amount to attribute to a given transaction, the type of cryptocurrency to be rewarded, and a manner in which the reward is to be provided to the user.

At block 706, the process 700 may include determining whether the cryptocurrency reward amount satisfies a preauthorized amount stored in association with a pre-funded wallet. To do so, the rewards component may query a pre-funded wallet of the cryptocurrency exchange system to determine if enough cryptocurrency funds are available in the pre-funded wallet to provide the cryptocurrency reward amount to the user. For example, the pre-funded wallet may be configured to store a given range of cryptocurrency value and/or to store at least a threshold amount of cryptocurrency, etc. Additionally, when the value of the pre-funded wallet drops below a threshold amount, it may be determined that the pre-funded wallet does not contain sufficient funds, even when the funds still in the pre-funded wallet are more than the cryptocurrency reward amount.

At block 708, the process 700 may include, in response to determining the cryptocurrency reward amount satisfies the preauthorized amount, facilitating transfer of the cryptocurrency reward amount from the pre-funded wallet to the account. The account may include a wallet, which may be a digital wallet that associates an account identifier of the user account with cryptocurrency (or other) amounts available to the user account. An example wallet may include indicators that, for a given user account, the user has $1,000 of a first cryptocurrency, $500 of a second cryptocurrency, $300 not associated with cryptocurrency, etc. In this example, the rewards component may facilitate a transaction where the cryptocurrency reward amount is deposited such that the wallet of the user indicates the additional cryptocurrency amount is available to the user. It should be understood that the initiation of the cryptocurrency-related transaction may differ in one or more respects from a concluded cryptocurrency transaction, particularly where a period of time is needed to perform blockchain-related processes and to associate a block in the blockchain at issue with the transaction.

At block 710, the process 700 may include, in response to determining the cryptocurrency reward amount does not satisfy the preauthorized amount: acquiring additional cryptocurrency for the pre-funded wallet; and facilitating transfer of a portion of the additional cryptocurrency that corresponds to the cryptocurrency reward amount to the account. For example, an exchange may facilitate the purchase of additional cryptocurrency utilizing a pre-funded account. Facilitating the purchase of the additional cryptocurrency may be performed in a manner generally consistent with the purchase of cryptocurrency utilize the exchange. In the examples described herein, the cryptocurrency purchased may be based at least in part on user preferences, exchange rates, network availability, transaction processing speed and/or costs, and/or one or more factors that may limit the transactional cost (both monetarily and computationally) of adding cryptocurrency to the pre-funded wallet.

Additionally, or alternatively, the process 700 may include determining whether the cryptocurrency reward amount satisfies a preauthorized amount stored in association with a pre-funded wallet. The process 700 may also include, in response to determining the cryptocurrency reward amount satisfies the preauthorized amount, facilitating transfer of the cryptocurrency reward amount from the pre-funded wallet to the lending platform. The process 700 may also include, in response to determining the cryptocurrency reward amount does not satisfy the preauthorized amount: acquiring additional cryptocurrency for the pre-funded wallet; and facilitating transfer of a portion of the additional cryptocurrency that corresponds to the cryptocurrency reward amount to the lending platform.

Additionally, or alternatively, the process 700 may include, in response to the cryptocurrency reward amount being deposited into the lending platform instead of a wallet associated with the account, adjusting an amount of earnings from lending the cryptocurrency reward amount.

Additionally, or alternatively, the process 700 may include determining a total balance of cryptocurrency associated with the account that is being utilized by the lending platform and determining that the total balance satisfies a threshold balance. The process 700 may also include adjusting an amount of earnings from lending the cryptocurrency reward amount based at least in part on the total balance satisfying the threshold balance.

Additionally, or alternatively, the process 700 may include determining a portion of cryptocurrency associated with the account that is being utilized by the lending platform. The process 700 may also include determining that the portion of cryptocurrency is at least a threshold amount of total cryptocurrency associated with the account. The process 700 may also include adjusting an amount of earnings from lending the cryptocurrency reward amount based at least in part on the portion of cryptocurrency being at least the threshold amount of the total cryptocurrency.

Additionally, or alternatively, the process 700 may include determining an amount of time that the cryptocurrency reward amount has been utilized by the lending platform without being transferred to the wallet. The process 700 may also include determining that the amount of time is at least a threshold amount of time. The process 700 may also include adjusting an amount of earnings from lending the cryptocurrency reward amount based at least in part on the amount of time being at least the threshold amount of time.

Additionally, or alternatively, the process 700 may include determining, at a time when the purchase occurs, earning percentages associated with types of cryptocurrency associated with the lending platform. The process 700 may also include causing display of the earning percentages and receiving input data indicating a selection of a type of cryptocurrency from the types of cryptocurrency, the type of cryptocurrency associated with a first earning percentage of the earning percentages. In these examples, automatically depositing the cryptocurrency reward amount into the lending platform may include automatically depositing the cryptocurrency reward amount in the type of cryptocurrency.

Additionally, or alternatively, the process 700 may include determining a product category associated with the purchase and determining an earning amount associated with the product category. The process 700 may also include associating the earning amount with the cryptocurrency reward amount deposited into the lending platform.

FIG. 8 illustrates another example process 800 associated with a payment instrument cryptocurrency rewards and lending platform. The order in which the operations or steps are described is not intended to be construed as a limitation, and any number of the described operations may be combined in any order and/or in parallel to implement process 800.

At block 802, the process 800 may include receiving an indication that a payment instrument has been utilized to make a purchase, the payment instrument associated with an account. For example, a transaction component of a cryptocurrency exchange system may be configured to receive one or more indications of payments made utilizing the payment instrument. The indications may include a personal account number or otherwise an identifier of the payment instrument, an identifier of the user account associated with the payment instrument, an identifier of the merchant at issue, an amount of the purchase, a date and/or time of the purchase, and/or any other information associated with the purchase. Transaction data such as this may be received for multiple payment instruments associated with multiple accounts utilized in association with the cryptocurrency exchange platform. In examples, the transaction data may be received in real time and/or in near-real time utilizing one or more secure methods, such as through the exchange of tokens, the use of application programming interfaces (APIs), etc.

At block 804, the process 800 may include determining a cryptocurrency reward amount to apply based at least in part on an amount of the purchase. For example, a rewards component of the cryptocurrency exchange system may be configured to receive the transaction data from the transaction queue and determine a cryptocurrency reward amount to attribute to the user account. For example, say the payment instrument is associated with at least an initial reward amount of 3% cryptocurrency for purchases made using the payment instrument. A given transaction may be for $100, and the rewards component may be configured to utilize transaction data indicating that $100 transaction to determine that the cryptocurrency reward amount for the transaction is $3 worth of cryptocurrency. The reward component may also be utilized to determine, on the fly, the reward amount for a given transaction. For example, the reward amount may differ based at least in part on one or more factors associated with the transaction, the user account, and/or how the rewards amounts have been utilized previously. The rewards component may be configured to utilize some or all of the data described above to determine a cryptocurrency reward amount to attribute to a given transaction, the type of cryptocurrency to be rewarded, and a manner in which the reward is to be provided to the user.

At block 806, the process 800 may include determining that the account indicates the cryptocurrency reward amount is to be provided to a lending platform instead of a wallet associated with the account, the lending platform configured to facilitate lending of cryptocurrency to one or more entities in exchange for a monetary return. For example, the user may have provided user input indicating a user preference to have the cryptocurrency rewards amount deposited into a wallet of the user. However, in other examples, the cryptocurrency reward amount may be deposited into an account associated with the lending platform when the user preferences indicate a preference to do so.

In examples where the user preferences indicate the cryptocurrency reward amount should be automatically deposited, At block 808, the process 800 may include automatically depositing the cryptocurrency reward amount into the lending platform based at least in part on the account indicating the cryptocurrency reward amount is to be provided to the lending platform. For example, the lending platform may be a component of the cryptocurrency exchange system and may be configured to allow users to lend their cryptocurrency to one or more other entities and/or systems in exchange for an earning amount. To illustrate, a user account may have associated therewith certain cryptocurrency and/or money, such as US dollars. The user may provide user input requesting that some or all of the cryptocurrency be taken from the wallet of the user and deposited into one or more accounts associated with the lending platform. The user input may also indicate the entities, systems, or otherwise options for lending the user's cryptocurrency. For example, certain borrowers associated with the lending platform may be associated with certain yields or otherwise rates of return, such as a first entity having an 8% annual rate of return, a second entity having a 7% rate of return, etc. The user may select the option that best fits their portfolio objectives and the cryptocurrency at issue may be transferred from the wallet of the user account to the accounts at issue in the lending platform.

Additionally, or alternatively, the process 800 may include determining a number of cryptocurrency assets associated with the account being utilized by the lending platform. The process 800 may also include determining the number of the cryptocurrency assets satisfies a threshold number of cryptocurrency assets. The process 800 may also include adjusting an amount of earnings from lending the cryptocurrency reward amount based at least in part on the number of the cryptocurrency assets satisfying the threshold number of cryptocurrency assets.

Additionally, or alternatively, the process 800 may include determining a number of recurring cryptocurrency orders set up in association with the account. The process 800 may also include determining that the number of the recurring cryptocurrency orders satisfies a threshold number of orders. The process 800 may also include adjusting an amount of earnings from lending the cryptocurrency reward amount based at least in part on the number of the recurring cryptocurrency orders satisfying the threshold number of orders.

Additionally, or alternatively, the process 800 may include determining a number of cryptocurrency trades made in association with the account during a predefined amount of time. The process 800 may also include determining that the number of cryptocurrency trades satisfies a threshold number of cryptocurrency trades. The process 800 may also include adjusting an amount of earnings from lending the cryptocurrency reward amount based at least in part on the number of cryptocurrency trades satisfying the threshold number of cryptocurrency trades.

Additionally, or alternatively, the process 800 may include determining that a cryptocurrency-to-cryptocurrency conversion was performed in association with the account. The process 800 may also include adjusting an amount of earnings from lending the cryptocurrency reward amount based at least in part on the cryptocurrency-to-cryptocurrency conversion being performed.

Additionally, or alternatively, the process 800 may include determining that a cryptocurrency trade associated with the account was performed for a cryptocurrency amount that is at least a threshold amount. The process 800 may also include adjusting an amount of earnings from lending the cryptocurrency reward amount based at least in part on the cryptocurrency amount of the cryptocurrency trade being at least the threshold amount.

Additionally, or alternatively, the process 800 may include determining a settlement amount associated with the purchase, the settlement amount being less than an initially reported amount associated with the purchase. The process 800 may also include in response to the settlement amount being less than the initially reported amount: determining to refrain from removing a portion of the cryptocurrency reward amount from the lending platform; and indicating a negative adjustment amount in a rewards queue associated with the account. The process 800 may also include in response to receiving an indication of a subsequent purchase utilizing the payment instrument, applying the negative adjustment amount to a reward associated with the subsequent purchase.

Additionally, or alternatively, the process 800 may include determining an amount of cryptocurrency rewards being applied to accounts associated with the system over a period of time. The process 800 may also include determining a first preauthorized amount to store in association with a pre-funded wallet based at least in part on the amount of the cryptocurrency rewards being applied to the accounts over the period of time. The process 800 may also include identifying, utilizing a trained machine learning model, one or more trends in cryptocurrency rewards amounts. The process 800 may also include adjusting the preauthorized amount from the preauthorized amount to a second preauthorized amount based at least in part on the one or more trends.

Figure 9:
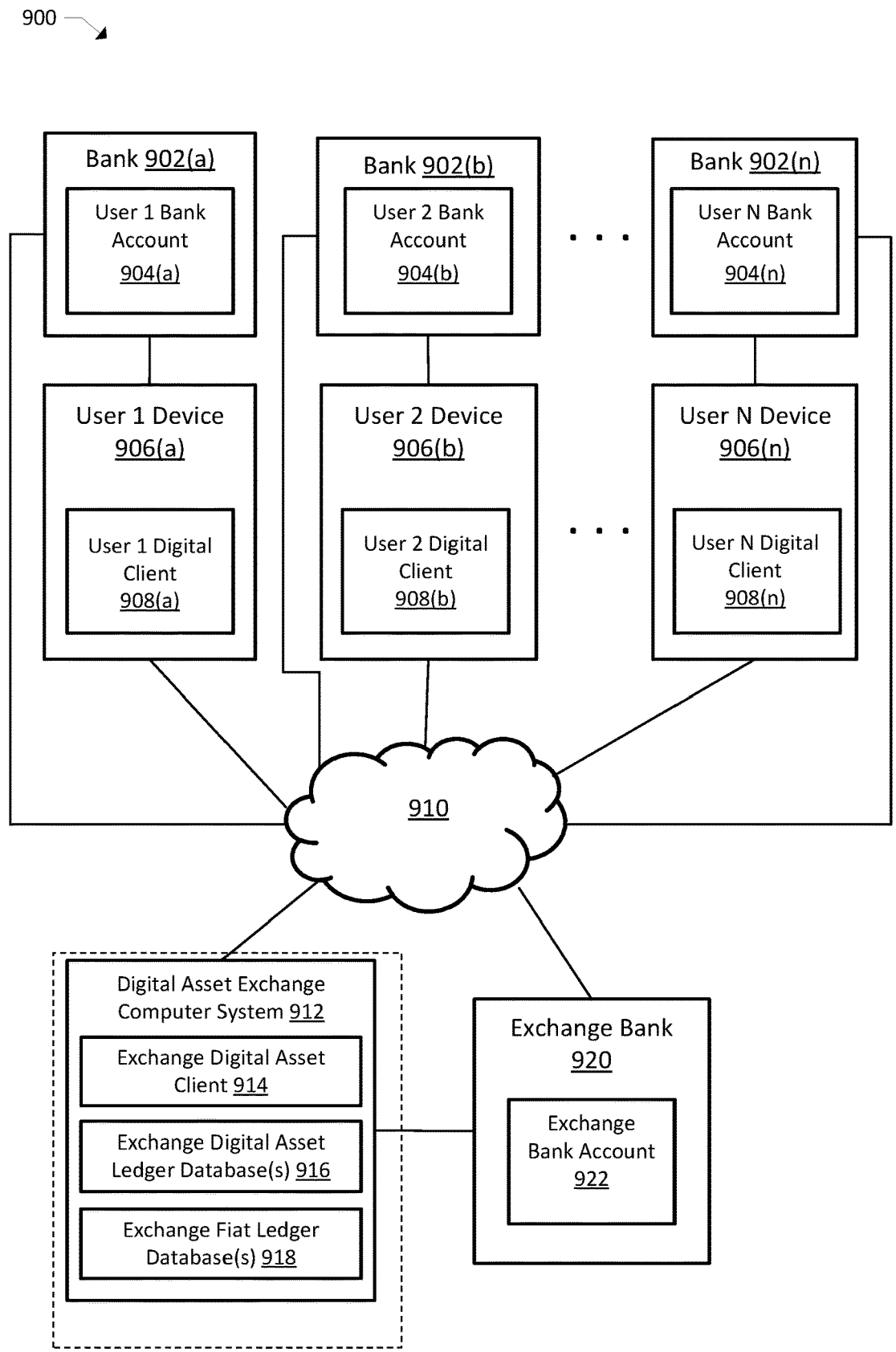
FIG. 9 illustrates a schematic diagram of exemplary participants in a system employing a digital asset exchange.

FIG. 9) illustrates a schematic diagram of exemplary participants in a system employing a digital asset exchange. In a digital asset exchange, one or more customers of the exchange (e.g., User 1, User 2, User 3, etc.) connect via a network 910 (e.g., the Internet, a local area network, a wide area network, etc.) to a digital asset exchange computer system 912, using respective one or more user electronic devices 906 (e.g., 906 (*a*), 906 (*b*), . . . , 906 (*n*)), such as computers, laptops, tablet computers, televisions, mobile phones, smartphones, and/or PDAs, etc. Each user may also have user bank accounts 904 held at one or more corresponding banks 902 (e.g., User 1 will have a User 1 Bank Account 904 (*a*) at Bank 902 (*a*), User 2 will have User 2 Bank Account 904 (*b*) at Bank 902 (*b*), etc.), which in turn may be accessed by a corresponding user device (e.g., User 1 Device 906 (*a*), User 2 Device 906 (*b*), etc.). In embodiments, functionality may be installed on a bank mobile application, which may access an application programing interface (API) of one or more exchanges. Similarly, each user may (or may not) also maintain a digital client (e.g., User 1 Digital Client 908 (*a*), User 2 Digital Client 908 (*b*), etc.), either on their respective user device or in some cases offline, to facilitate access to their respective bank accounts from a user device and/or from a digital client or digital address associated therewith.

The participants may be connected directly and/or indirectly, such as through a data network 910, as discussed herein. Users of a digital asset exchange may be customers of the digital asset exchange, such as digital asset buyers and/or digital asset sellers. Digital asset buyers may pay fiat (e.g., U.S. Dollars, Euro, Yen, British Pound, Swiss Franc, Canadian Dollar, Australian Dollar, New Zealand Dollar, Kuwaiti Dinar, Bahrain Dinar, Oman Rial, Jordan Dinar, Cayman Island Dollar, South African Rand, Mexican Pesos, Renminbi, to name a few) in exchange for digital assets. Digital asset sellers may exchange digital assets for fiat or other digital assets.

The digital asset exchange computer systems 912 may track the users' respective digital assets in the one or more exchange digital asset ledger databases 916 associated with the respective digital asset. For example, respective users' BITCOIN assets available for trading will be tracked in a BITCOIN exchange ledger. In turn, the respective digital assets themselves will be maintained in exchange digital clients that are controlled by the one or more private keys associated with each digital client.

Similarly, the digital asset exchange computer system 912 will track the users' respective fiat in one or more exchange fiat databases 918 associated with the respective fiat. For example, respective users' U.S. Dollar assets available for trading will be tracked in a U.S. Dollar exchange ledger. In turn, the respective fiat will be maintained in one or more exchange bank accounts 922 in respective exchange bank(s) 920, that are typically held in the name of the digital asset exchange on behalf of its customers. A digital asset exchange may have one or more bank accounts, e.g., bank account 922, held at one or more banks 920, such as exchange banks or exchange partner banks, which are banks associated with and/or in partnership with the digital asset exchange. In embodiments, exchanges may access other repositories for fiat currency. An exchange bank account 922 may be a pass-through account that receives fiat currency deposits from a digital asset buyer and transfers the fiat currency to a digital asset seller. The exchange bank account may hold money in escrow while an exchange transaction is pending. For example, the exchange bank account may hold a digital asset buyer's fiat currency until a digital asset seller transfers digital assets to the buyer, to an exchange, or to an authorized third-party. Upon receipt by the appropriate recipient of the requisite amount of digital assets, the digital asset exchange may authorize the release of the fiat currency to the digital asset seller. In embodiments, an exchange may hold, e.g., as a custodian, fiat in bank accounts and digital assets in digital clients at associated digital asset addresses. In embodiments, instead of using bank accounts, other stable investment instruments such as money market mutual funds, treasury bills, CDs, low risk bonds, to name a few, may be used.

A digital asset exchange may have one or more digital asset exchange computer systems 912, which can include software running on one or more processors, as discussed herein, as well as computer-readable memory comprising one or more databases. A digital asset exchange can include one or more exchange digital asset clients, e.g., digital asset client 914. Exchange digital client may be used to store digital assets in one or more denominations from one or more parties to a transaction. In embodiments, the exchange digital clients may store digital assets owned by the digital asset exchange, which may be used when an exchange is a counterparty to an exchange transaction, and which can allow exchange transactions to occur even when a buyer and a seller are not otherwise both available and in agreement on transaction terms. Typically, access to such exchange digital clients is controlled by one or more private keys.

Figure 10:
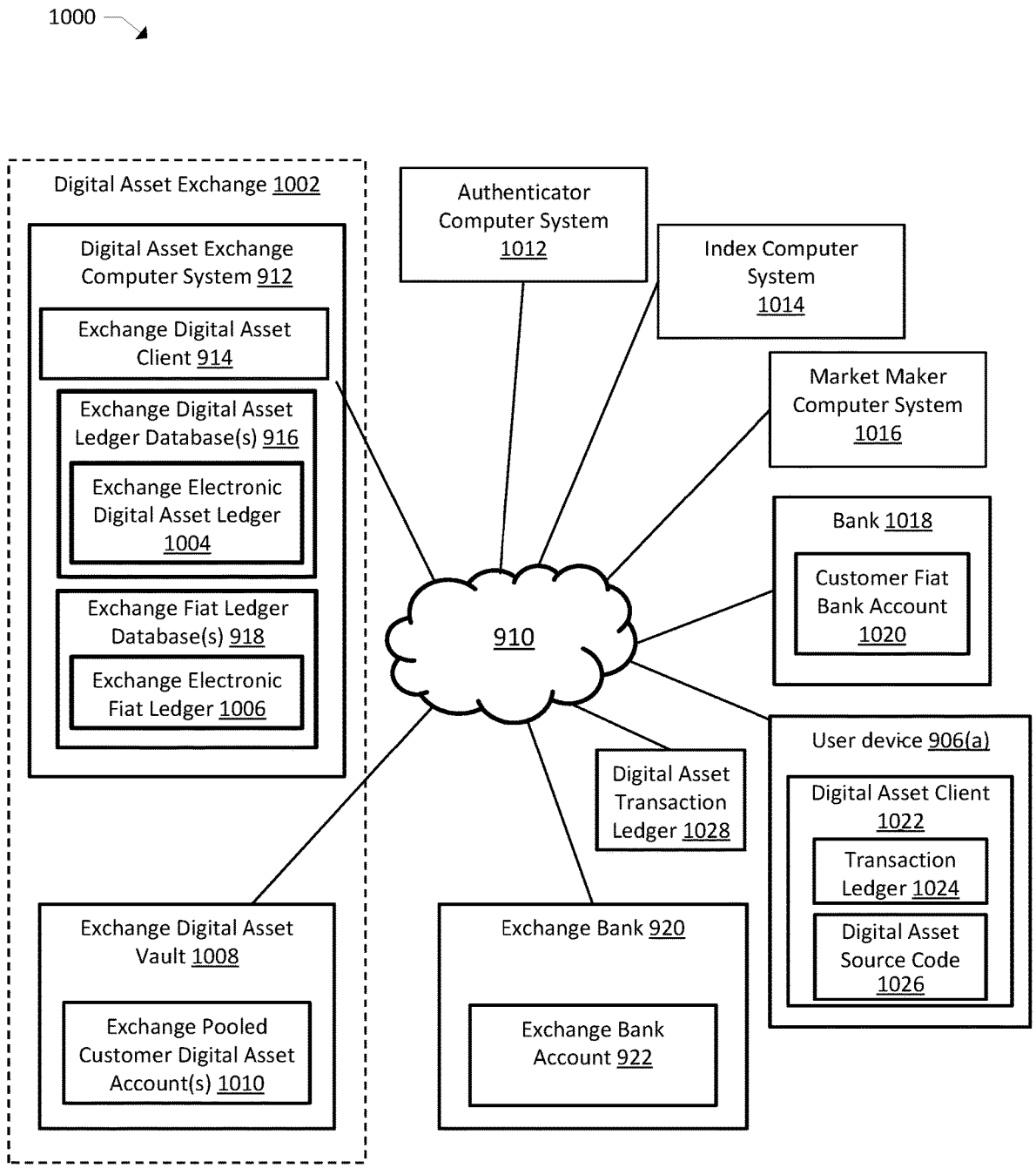
FIG. 10 illustrates a schematic diagram of additional features associated with a digital asset exchange.

FIG. 10 illustrates a schematic diagram of additional features associated with a digital asset exchange. Each entity may operate one or more computer systems. Computer systems may be connected directly or indirectly, such as through a data network (e.g., the Internet, a local area network, a wide area network, a proprietary network, to name a few). The digital asset exchange 1002 may be associated with a digital asset exchange computer system 912, exchange digital asset clients 914, for example, associated with one or more digital asset addresses (e.g., BITCOIN clients, ETHEREUM clients, LITECOIN clients, to name a few), customer banks 1018 having customer fiat bank accounts 1020, a digital asset network transaction ledger 1028 (e.g., the BITCOIN blockchain, the ETHEREUM blockchain, the LITECOIN blockchain, to name a few), a digital asset network (e.g., the BITCOIN network, the ETHEREUM network, the LITECOIN network, to name a few), one or more exchange customers using one or more customer user device 906 (*a*), one or more exchange digital asset electronic ledger(s) 916 one or more exchange digital asset vaults 1008, one or more exchange fiat electronic ledger databases(s) 918, and one or more exchange partner banks 920, which can have exchange bank account(s) 922 for holding pooled customer fiat, to name a few. The exchange digital asset vaults 1008 can store a plurality of digital asset clients, which may be pooled exchange customer digital asset accounts 1010 with associated digital asset addresses. In embodiments, the digital asset exchange 1002 may have one or more partner banks 920, each with one or more respective exchange bank account(s) 922. Such account(s) may be associated with insurance protection, such as FDIC insurance protection in the U.S. In embodiments, the digital asset exchange 1002 may also communicate with an authenticator computer system 1012 (to authenticate users, e.g., using multi-factor authentication and/or comparisons to databases of flagged users, to name a few), an index computer system 1014 (e.g., for generating and/or providing a digital asset index, which may be a price index), and/or a market maker computer system 1016, to name a few. A market maker may be an exchange user, like a broker dealer or other entity, that provides liquidity for the digital asset exchange 1002 by purchasing or selling digital assets. The user device 906 (*a*) may include a digital asset client 1022, which may include a transaction ledger 1024 and digital asset source code 1026.

The digital asset exchange 1002 may employ an electronic ledger system to track customer digital assets and/or customer fiat holdings. Such a system may allow rapid electronic transactions among exchange customers and/or between exchange customers and the digital asset exchange 1002 itself using its own digital asset and fiat holdings or those of its sponsor or owner. In embodiments, the electronic ledger system may facilitate rapid computer-based automated trading, which may comprise use by one or more computer systems of a trading API provided by the digital asset exchange 1002. In embodiments, the electronic ledger system may also be used in conjunction with hot client digital asset security systems (e.g., where one or more private keys are maintained on a computer system that is immediately accessible), and/or cold storage digital asset security systems by the digital asset exchange 1002 (e.g., where one or more private keys are maintained on a computer system that is off-line), to name a few. Fiat (e.g., USD) and digital assets (e.g., BITCOIN, ETHER, LITECOIN, to name a few) can be electronically credited and/or electronically debited from respective (e.g., fiat and digital asset) electronic ledgers.

Clearing of transactions may be recorded nearly instantaneously on the electronic ledgers. Deposits of fiat with the digital asset exchange 1002 and withdrawals from the digital asset exchange 1002 may be recorded on the exchange electronic fiat ledger 1006, which may be provided in the exchange electronic fiat ledger database 918, while deposits and withdrawals of digital assets may be recorded on the exchange electronic digital asset ledger 1004, which may be provided in the exchange digital asset ledger database 916. Electronic ledgers may be maintained using one or more computers operated by the digital asset exchange 1002, its sponsor and/or agent, and stored on non-transitory computer-readable memory operatively connected to such one or more computers. In embodiments, electronic ledgers can be in the form of a database.

Figure 11:
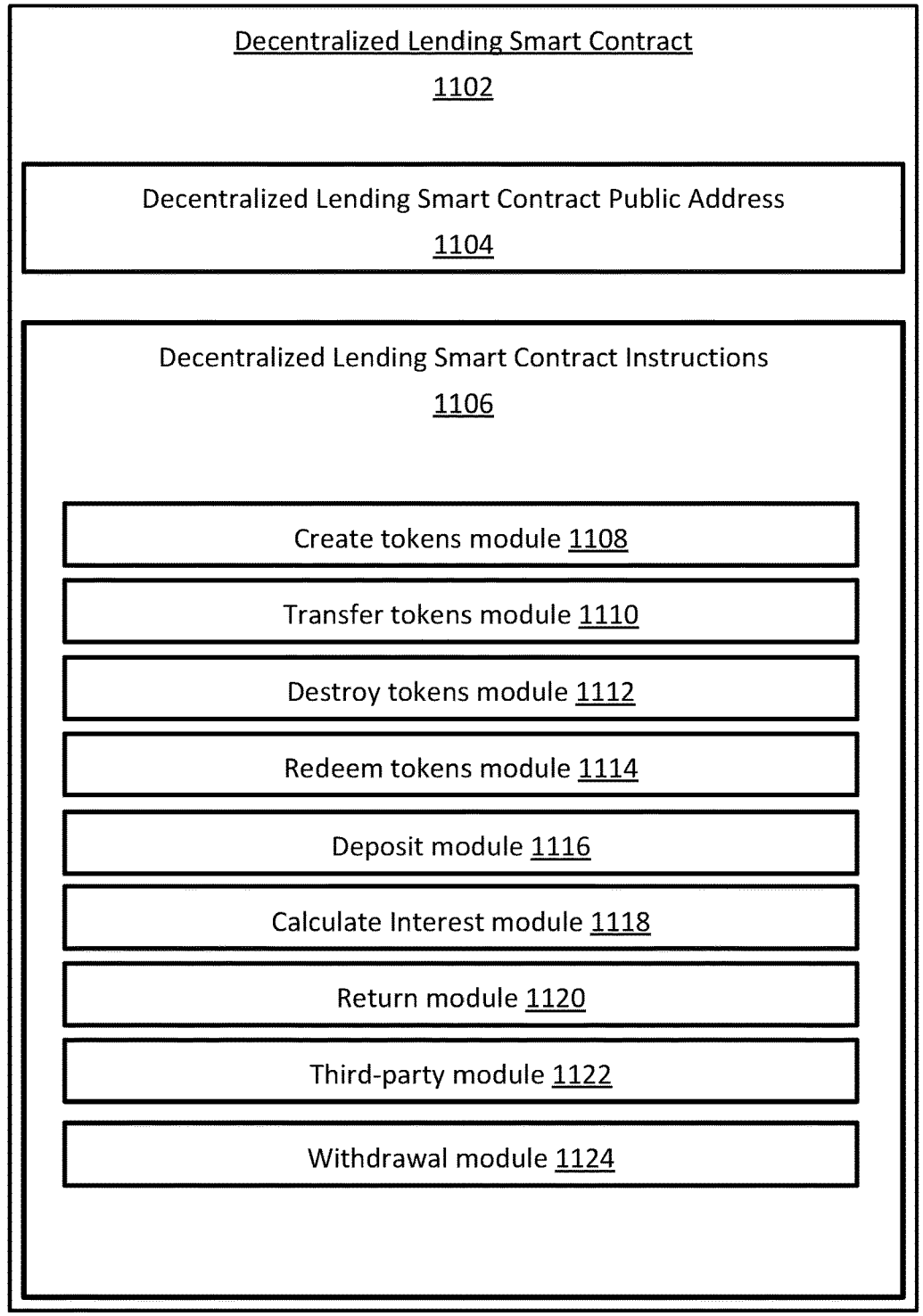
FIG. 11 illustrates a conceptual diagram of example components of lending smart contract instructions.

FIG. 11 illustrates a conceptual diagram of example components of lending smart contract instructions. A distributed digital asset transaction ledger (or blockchain) may include a decentralized lending smart contract 1102, which may include a public address 1104 (e.g., a second digital address) and smart contract instructions 1106. In embodiments, the decentralized lending smart contract public address 1104 may be associated with one or more proxy smart contracts, which may then issue calls to one or more other smart contracts having their own smart contract addresses on the blockchain.

The decentralized lending smart contract instructions 1106 may also include a plurality of instruction modules (e.g., modules 1108-1124), stored as part of the blockchain. In embodiments, the plurality of instruction modules may include processor executable code. In embodiments, the plurality of instruction modules may include compiled code. By way of illustration, in embodiments, such modules may include modules of instructions such as: (1) create tokens module 1108: (2) transfer tokens module 1110: (3) destroy tokens module 1112: (4) redeem tokens module 1114: (5) deposit module 1116: (6) calculate interest module 1118: (7) return module 1120; (8) third-party module 1122: (9) withdrawal module 1124 and/or a combination thereof, to name a few.

In embodiments, the create tokens module 1108 may include one or more instructions related to creating lending tokens associated with decentralized lending. For example, the create tokens module 1108 may include instructions that, when executed, cause the creation of one or more lending tokens that represent the first amount of the first digital asset lent to the decentralized lending smart contract 1102 for third-party lending or trading, in exchange for interest, which may be in the form of a first digital asset. The module may include further instructions to authorize the creation of the lending tokens under specified conditions, such as in response to the receipt of one or more authorized key pairs or contract addresses. In embodiments, the create tokens module 1108 may include instructions that when executed increase the lending token supply. In embodiments, the create tokens module 1108 may include instructions that when executed create new lending tokens within pre-approved lending token supply limits, create new lending tokens within a pre-approved amount of the lending token supply limits and a predetermined amount of the first digital asset held, and/or assign newly created or "minted" lending tokens to specific designated public addresses or contract addresses on an underlying blockchain associated with the respective customer and/or the digital asset exchange.

In embodiments, the transfer tokens module 1110, may include instructions related to transferring the lending tokens. In embodiments, such transfer instructions when executed apply rules by which certain transfers are allowed or blocked and may specify one or more key pair or contract addresses that may be authorized to perform one or more types of transfer operations. In embodiments, the transfer tokens module 1110 may include authorization instructions related to transferring lending tokens and/or digital assets associated with the lending tokens (e.g., the first digital asset) to specific designated public addresses or contract addresses on the underlying blockchain.

In embodiments, the destroy tokens module 1112 may include instructions related to destroying (e.g., burning) lending tokens. In embodiments, the destroy tokens module 1112 may include instructions related to when, and with what authority, lending tokens associated with one or more specified addresses shall be destroyed or "burned", and thus removed from the lending token supply. In embodiments, lending tokens may be burned or destroyed when they are redeemed by the respective customer and/or the digital asset exchange in exchange for the interest amount of the digital asset. In embodiments, lending tokens may be destroyed upon return of the interest amount of the digital asset and a return amount provided by the intermediary in exchange for lending of the interest amount of digital asset.

In embodiments, the redeem tokens module 1114, may include instructions related to redeeming one or more lending tokens (e.g., the second digital asset) for an amount of digital asset (e.g., the first digital asset). In embodiments, the redeem tokens module 1114 may include instructions that when executed determine a first amount of digital asset to transfer in exchange for redeeming one or more lending tokens. For example, a lending token may be redeemed for the interest amount of the first digital asset. In embodiments, the amount of digital asset to return in exchange for the redemption of one or more lending tokens may be made based on: interest/return information associated with the lending tokens, an amount of digital asset transferred to the decentralized lending smart contract 1102, an amount of time elapsed since the transfer of the amount of digital asset to the decentralized lending smart contract 1102, the types of digital asset transferred to the decentralized lending smart contract 1102, one or more third-party institutions associated with the lending of the amount of the digital asset, one or more reserve rules (e.g., rules stored by the digital asset exchange and/or rules stored on the blockchain as part of the decentralized lending smart contract instructions 1106), and/or a combination thereof, to name a few. In embodiments, the redeem tokens module 1114 may include instructions that when executed apply when, and with whose authority, lending tokens associated with one or more specified addresses shall be redeemed and, in embodiments, whether the redeemed lending tokens will be destroyed or "burned" as discussed above, and thus removed from the lending token supply. In embodiments, the redeem tokens module 1114 may include authorization instructions related to accessing data supplied by a first authorized third-party database (e.g., an administrator computer system), as discussed in further detail elsewhere.

Further, the deposit module 1116 may include instructions that when executed track and monitor one or more transfers of digital assets to the decentralized lending smart contract 1102. The deposit module 1116, in embodiments, for example, may track the public address(es) associated with each transfer of digital assets to the decentralized lending smart contract 1102, the date of each transfer, the time of each transfer, the amount of each transfer, and/or a combination thereof, to name a few. In embodiments, the deposit module 1116 may include deposit instructions associated with the receipt of digital assets by the decentralized lending smart contract 1102. In embodiments, the deposit module may include instructions or a call that when executed issue one or more lending tokens based on the deposit of the digital assets.

The calculate interest module 1118, in embodiments, may include instructions that when executed calculate interest or a return accrued by the digital assets lent via the decentralized lending smart contract 1102. In embodiments, the calculate interest module 1118 may include instructions that when executed calculate the interest of each deposit of digital assets based on interest information or return information associated with the lending tokens, an amount of digital asset transferred to the decentralized lending smart contract 1102, an amount of time elapsed since the transfer of the amount of digital asset to the decentralized lending smart contract 1102, the types of digital asset transferred to the decentralized lending smart contract 1102, one or more third-party institutions associated with the lending of the amount of the digital asset, one or more reserve rules (e.g., rules stored by the digital asset exchange and/or rules stored on the blockchain as part of the decentralized lending smart contract instructions 1106), and/or a combination thereof, to name a few:

In embodiments, the return module 1120 may include instructions that when executed calculate and/or authorize payments in exchange for the amount of digital asset transferred and held at the decentralized lending smart contract 1102. For example, the return module 1120 may include authority to access information indicating the type of payment (e.g., one time return and redemption, an interest payment without redemption, payments in accordance with a payment schedule, to name a few). In embodiments, the return module 1120 may communicate with calculate interest module 1118, deposit module 1116, and/or redeem tokens module 1114 to determine the return payment and/or redemption payment. For example, the return module 1120 may confirm the balance of the digital asset and the calculated interest from the deposit module 1116 and the calculate interest module 1118, respectively. In embodiments, the return module 1120 may include return instructions associated with determining a return amount of digital assets to be provided to the first user in exchange for lending the amount of digital assets to the decentralized lending smart contract 1102. In embodiments, the return module 1120 may include return payment instructions associated with transferring a payment amount of the first digital asset to the respective customer interest-bearing account.

In embodiments, the third-party module 1122 may include authorization instructions related to loaning and trading at least a portion of the amount of digital assets held at the fourth contract address by third parties. For example, the third parties may, in embodiments, include third-party institutions associated with a first customer intermediary account associated with the decentralized lending smart contract 1102. In embodiments, the third-party module 1122 may include third-party instructions associated with at least one of: loaning of the at least a portion of the fourth amount of digital assets by third-party institutions associated with the first customer intermediary account and/or trading of the at least a portion of the fourth amount of digital assets by third-party institutions associated with the first customer intermediary account.

In embodiments, the withdrawal module 1124 may include authorization instructions related to withdrawing an amount of digital asset lent to the decentralized lending smart contract 1102. For example, the withdrawal module 1124 may track ownership and custody of digital assets lent to the decentralized lending smart contract 1102. In embodiments, the withdrawal module 1124 may include execution instructions associated with when, and with whose authority, digital assets associated with one or more specified addresses shall be withdrawn. In embodiments, the withdrawal module 1124 may include withdrawal instructions associated with returning the portion of the interest amount of the first digital asset to the respective customer. The withdrawal instructions, in embodiments, may include first return payment instructions associated with returning a return payment amount of the first digital asset to the respective customer interest-bearing account. In embodiments, the amount of digital assets paid under the withdrawal module 1124 may be determined in conjunction with the return module and the calculate interest module.

In embodiments, decentralized lending smart contract instructions 1106 may include authorization instructions. The authorization instructions, in embodiments, may include authorization instructions related to functions associated with decentralized lending. In embodiments, decentralized lending smart contract instructions 1106 may also include instructions that when executed authorize requests received, the requests, in embodiments, being transaction requests from administrators, user public addresses, and/or other smart contracts, to name a few. The decentralized lending smart contract 1102, in embodiments, may include tokens, which may reflect other types of tokens, such as tokens associated with a security, a bond, a financial instrument, a contract, stock, gas tokens, and/or some other kind of token, which the parties to the transaction reflect as an appropriate collateral.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system, comprising:
one or more processors; and
non-transitory computer-readable media storing instructions that, when executed by the one or more processors, cause the one or more processors to perform operations comprising:
receiving an indication that a payment instrument has been utilized to purchase at least one of a good or a service, the payment instrument associated with an account indicating that a reward for usage of the payment instrument is to include cryptocurrency;
determining transaction data associated with the purchase including an amount of the purchase;
generating a training dataset from the transaction data;
generating at least one trained machine learning model based at least in part on the training dataset;
determining a cryptocurrency reward amount to apply based on the amount of the purchase and the at least one trained machine learning model;
generating a pre-funded wallet, prior to receiving the indication that the payment instrument has been utilized to purchase the at least one of the good or the service, the pre-funded wallet associated with a secure token held by a cryptocurrency exchange associated with the system and stored in a memory of the cryptocurrency exchange associated with the system;
determining whether the cryptocurrency reward amount satisfies a preauthorized amount stored in association with the pre-funded wallet, wherein determining whether the cryptocurrency reward amount satisfies the preauthorized amount is based at least in part on multiple requests for the cryptocurrency being made to the preauthorized wallet within an amount of time of when the indication was received;
in response to determining the cryptocurrency reward amount satisfies the preauthorized amount, facilitating transfer of the cryptocurrency reward amount from the pre-funded wallet that is stored in the memory of the cryptocurrency exchange associated with the system to the account;
in response to determining the cryptocurrency reward amount does not satisfy the preauthorized amount:
generating transfer instructions that cause additional cryptocurrency to be acquired for the pre-funded wallet from one or more cryptocurrency sources; and
facilitating transfer of a portion of the additional cryptocurrency that corresponds to the cryptocurrency reward amount from the pre-funded wallet to the account;
determining, at a time when the purchase occurs, earning percentages associated with types of cryptocurrency associated with a lending platform;
causing display of the earning percentages;
receiving input data indicating a selection of a type of cryptocurrency from the types of cryptocurrency, the type of cryptocurrency associated with a first earning percentage of the earning percentages; and
automatically depositing the cryptocurrency reward amount into the lending platform in the type of cryptocurrency;
generating a testing group with a first outcome, the first outcome being a known outcome;
generating a second outcome using the at least one trained machine learning model, the second outcome being an unknown outcome;
determining whether the at least one trained machine learning model indicates improved performance metrics based at least in part on comparing the first outcome to the second outcome; and
determining to utilize a previous iteration of the at least one machine learning model for generating subsequent results in response to the at least one trained machine learning model not indicating improved performance metrics;
determining that a lending threshold has been satisfied by the transfer of the cryptocurrency reward amount to the lending platform;
in response to the lending threshold being satisfied, adjusting an amount of earnings from lending the cryptocurrency reward amount;
determining that a spending threshold associated with the payment instrument has been satisfied by purchasing the at least one of the good or the service; and
in response to the spending threshold being satisfied, adjusting the amount of earnings from lending the cryptocurrency reward amount.

2. The system of claim 1, the operations further comprising:
receiving input data requesting transfer of the cryptocurrency reward amount from a wallet of the account to the lending platform, the lending platform configured to facilitate lending of the cryptocurrency to one or more entities in exchange for a monetary return; and
facilitating transfer of the cryptocurrency reward amount from the wallet of the account to the lending platform in response to the input data.

3. A method performed by a computing device, the computing device including:
one or more processors; and
non-transitory computer-readable media storing instructions that, when executed by the one or more processors, cause the one or more processors to perform operations comprising:
receiving an indication that a payment instrument has been utilized to make a purchase, the payment instrument associated with an account;
determining transaction data associated with the purchase including an amount of the purchase;
generating a training dataset from the transaction data;
generating at least one trained machine learning model based at least in part on the training dataset;
determining a cryptocurrency reward amount to apply based at least in part on the amount of the purchase and the at least one trained machine learning model;
determining that the account indicates the cryptocurrency reward amount is to be provided to a lending platform instead of a wallet associated with the account, the lending platform configured to facilitate lending of cryptocurrency to one or more entities unassociated with a system that determined the cryptocurrency reward amount in exchange for a monetary return;
generating a pre-funded wallet, prior to receiving the indication that the payment instrument has been utilized to make the purchase, the pre-funded wallet associated with a secure token held by a cryptocurrency exchange system and stored in a memory of the cryptocurrency exchange system;
determining that the cryptocurrency reward amount satisfies a preauthorized amount stored in association with the pre-funded wallet based at least in part on multiple requests for the cryptocurrency being made to the preauthorized wallet within an amount of time of when the indication was received;
automatically depositing the cryptocurrency reward amount into the lending platform from the pre-funded wallet that is stored in the memory of the cryptocurrency exchange system associated with the system based at least in part on the account indicating the cryptocurrency reward amount is to be provided to the lending platform;
determining, at a time when the purchase occurs, earning percentages associated with types of cryptocurrency associated with the lending platform;
causing display of the earning percentages;
receiving input data indicating a selection of a type of cryptocurrency from the types of cryptocurrency, the type of cryptocurrency associated with a first earning percentage of the earning percentages;
wherein automatically depositing the cryptocurrency reward amount into the lending platform includes automatically depositing the cryptocurrency reward amount in the type of cryptocurrency;
generating a testing group with a first outcome, the first outcome being a known outcome;
generating a second outcome using the at least one trained machine learning model, the second outcome being an unknown outcome;
determining whether the at least one trained machine learning model indicates improved performance metrics based at least in part on comparing the first outcome to the second outcome;
determining to:
utilize the at least one trained machine learning model for generating subsequent results in response to the at least one trained machine learning model indicating improved performance metrics; or
not utilize the at least one trained machine learning model for generating subsequent results in response to the at least one trained machine learning model not indicating improved performance metrics;

determining a total balance of cryptocurrency associated with the account that is being utilized by the lending platform;

determining that the total balance satisfies a threshold balance;

adjusting an amount of earnings from lending the cryptocurrency reward amount based at least in part on the total balance satisfying the threshold balance;

determining a portion of cryptocurrency associated with the account that is being utilized by the lending platform;

determining that the portion of cryptocurrency is at least a threshold amount of total cryptocurrency associated with the account;

adjusting the amount of earnings from lending the cryptocurrency reward amount based at least in part on the portion of cryptocurrency being at least the threshold amount of the total cryptocurrency;

determining an amount of time that the cryptocurrency reward amount has been utilized by the lending platform without being transferred to the wallet;

determining that the amount of time is at least a threshold amount of time; and adjusting the amount of earnings from lending the cryptocurrency reward amount based at least in part on the amount of time being at least the threshold amount of time.

4. The method of claim 3, further comprising:

in response to determining the cryptocurrency reward amount does not satisfy the preauthorized amount:

acquiring additional cryptocurrency for the pre-funded wallet; and facilitating transfer of a portion of the additional cryptocurrency that corresponds to the cryptocurrency reward amount to the lending platform.

5. The method of claim 3, further comprising, in response to the cryptocurrency reward amount being deposited into the lending platform instead of a wallet associated with the account, adjusting an amount of earnings from lending the cryptocurrency reward amount.

6. A system, comprising:

one or more processors; and non-transitory computer-readable media storing instructions that, when executed by the one or more processors, cause the one or more processors to perform operations comprising:

determining transaction data associated with a purchase including an amount of a purchase;

generating a training dataset from the transaction data;

generating at least one trained machine learning model based at least in part on the training dataset;

determining a cryptocurrency reward amount to apply to an account based at least in part on the amount of the purchase made utilizing a payment instrument and the at least one trained machine learning model;

determining that a user preference of the account indicates the cryptocurrency reward amount is to be deposited into to a lending platform instead of a wallet associated with the account, the lending platform configured to facilitate lending of cryptocurrency in exchange for a monetary return;

generating a pre-funded wallet, prior to determining the cryptocurrency reward amount, the pre-funded wallet associated with a secure token held by a cryptocurrency exchange associated with the system and stored in a memory of the cryptocurrency exchange associated with the system;

determining that the cryptocurrency reward amount satisfies a preauthorized amount stored in association with the pre-funded wallet that is stored in the memory of the cryptocurrency exchange associated with the system based at least in part on multiple requests for the cryptocurrency being made to the preauthorized wallet within an amount of time of when the indication was received;

automatically depositing the cryptocurrency reward amount into the lending platform from the pre-funded wallet based at least in part on the user preference;

determining, at a time when the purchase occurs, earning percentages associated with types of cryptocurrency associated with the lending platform;

causing display of the earning percentages;

receiving input data indicating a selection of a type of cryptocurrency from the types of cryptocurrency, the type of cryptocurrency associated with a first earning percentage of the earning percentages; and wherein automatically depositing the cryptocurrency reward amount into the lending platform includes automatically depositing the cryptocurrency reward amount in the type of cryptocurrency;

generating a testing group with a first outcome, the first outcome being a known outcome;

generating a second outcome using the at least one trained machine learning model, the second outcome being an unknown outcome;

determining whether the at least one trained machine learning model indicates improved performance metrics based at least in part on comparing the first outcome to the second outcome; and determining to:

utilize the at least one trained machine learning model for generating subsequent results in response to the at least one trained machine learning model indicating improved performance metrics; or not utilize the at least one trained machine learning model for generating subsequent results in response to the at least one trained machine learning model not indicating improved performance metrics determining a number of cryptocurrency assets associated with the account being utilized by the lending platform;

determining the number of the cryptocurrency assets satisfies a threshold number of cryptocurrency assets;

adjusting an amount of earnings from lending the cryptocurrency reward amount based at least in part on the number of the cryptocurrency assets satisfying the threshold number of cryptocurrency assets;

determining a number of recurring cryptocurrency orders set up in association with the account;

determining that the number of the recurring cryptocurrency orders satisfies a threshold number of orders;

adjusting the amount of earnings from lending the cryptocurrency reward amount based at least in part on the number of the recurring cryptocurrency orders satisfying the threshold number of orders;

determining a number of cryptocurrency trades made in association with the account during a predefined amount of time;

determining that the number of cryptocurrency trades satisfies a threshold number of cryptocurrency trades; and adjusting the amount of earnings from lending the cryptocurrency reward amount based at least in part on the number of cryptocurrency trades satisfying the threshold number of cryptocurrency trades.

7. The system of claim 6, the operations further comprising:
- determining that a cryptocurrency-to-cryptocurrency conversion was performed in association with the account; and
- adjusting an amount of earnings from lending the cryptocurrency reward amount based at least in part on the cryptocurrency-to-cryptocurrency conversion being performed.

8. The system of claim 6, the operations further comprising:
- determining that a cryptocurrency trade associated with the account was performed for a cryptocurrency amount that is at least a threshold amount; and
- adjusting an amount of earnings from lending the cryptocurrency reward amount based at least in part on the cryptocurrency amount of the cryptocurrency trade being at least the threshold amount.

9. The system of claim 6, the operations further comprising:
- determining a settlement amount associated with the purchase, the settlement amount being less than an initially reported amount associated with the purchase;
- in response to the settlement amount being less than the initially reported amount:
- determining to refrain from removing a portion of the cryptocurrency reward amount from the lending platform; and
- indicating a negative adjustment amount in a rewards queue associated with the account; and
- in response to receiving an indication of a subsequent purchase utilizing the payment instrument, applying the negative adjustment amount to a reward associated with the subsequent purchase.

10. The system of claim 6, the operations further comprising:
- determining an amount of cryptocurrency rewards being applied to accounts associated with the system over a period of time;
- determining a first preauthorized amount to store in association with the pre-funded wallet based at least in part on the amount of the cryptocurrency rewards being applied to the accounts over the period of time;
- identifying, utilizing a trained machine learning model, one or more trends in cryptocurrency rewards amounts; and
- adjusting the preauthorized amount from the preauthorized amount to a second preauthorized amount based at least in part on the one or more trends.

11. The system of claim 1, further comprising causing display of a transaction history, a rewards section, and a preferences section.

12. The system of claim 11, wherein the preferences section includes at least a preferred currency, a preferred distribution, an automatic deposit to lending platform, a recommendation, and an automatic transfer based on yield.

* * * * *